Jan. 7, 1930.　　　　W. S. GUBELMANN　　　　1,742,522
ADDING AND RECORDING MACHINE
Original Filed Jan. 10, 1900　　9 Sheets-Sheet 1

William S. Gubelmann
Inventor

Jan. 7, 1930.  W. S. GUBELMANN  1,742,522
ADDING AND RECORDING MACHINE
Original Filed Jan. 10, 1900  9 Sheets-Sheet 2
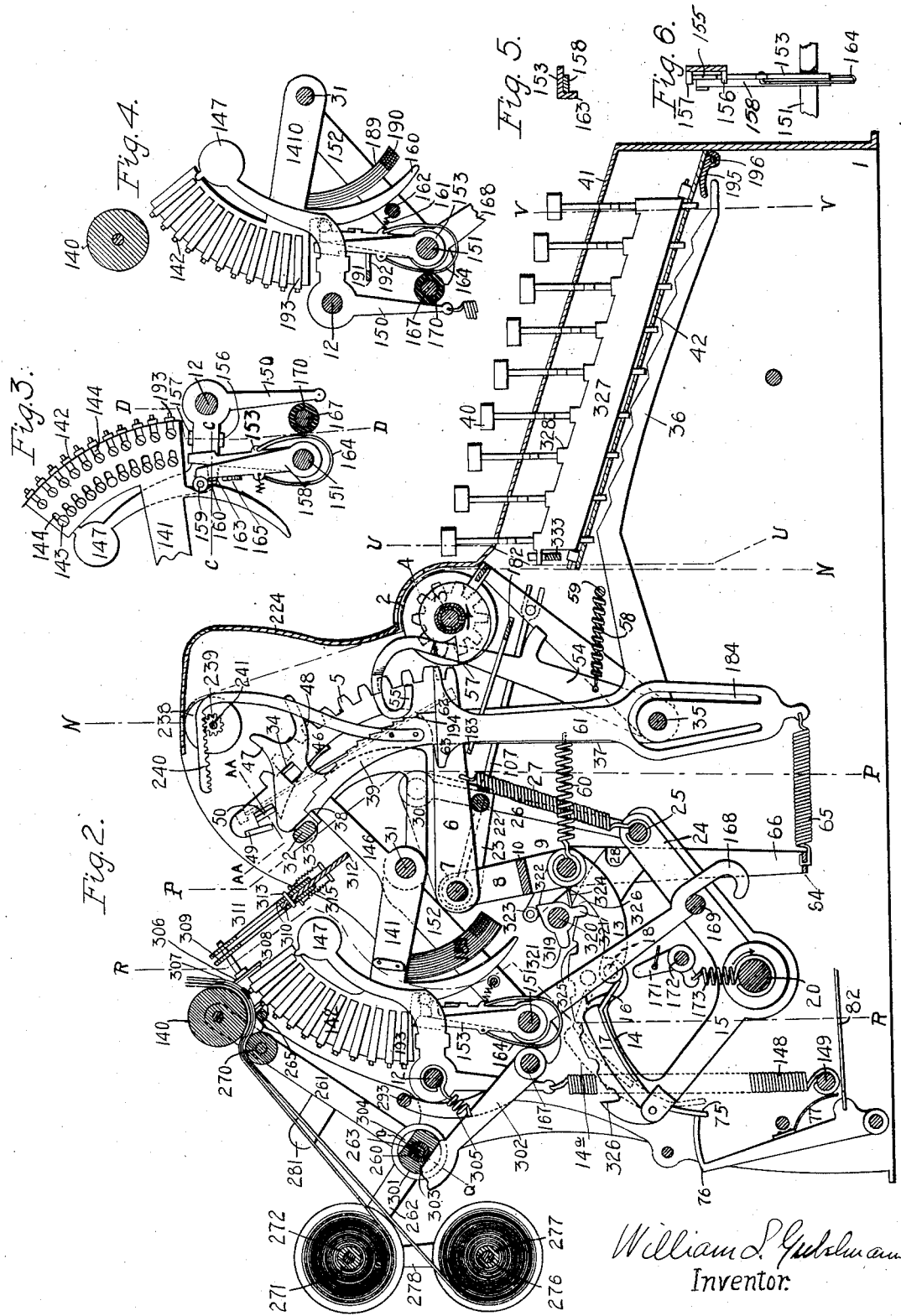
William S. Gubelmann
Inventor.

Jan. 7, 1930.　　　W. S. GUBELMANN　　　1,742,522
ADDING AND RECORDING MACHINE
Original Filed Jan. 10, 1900　　9 Sheets-Sheet 3
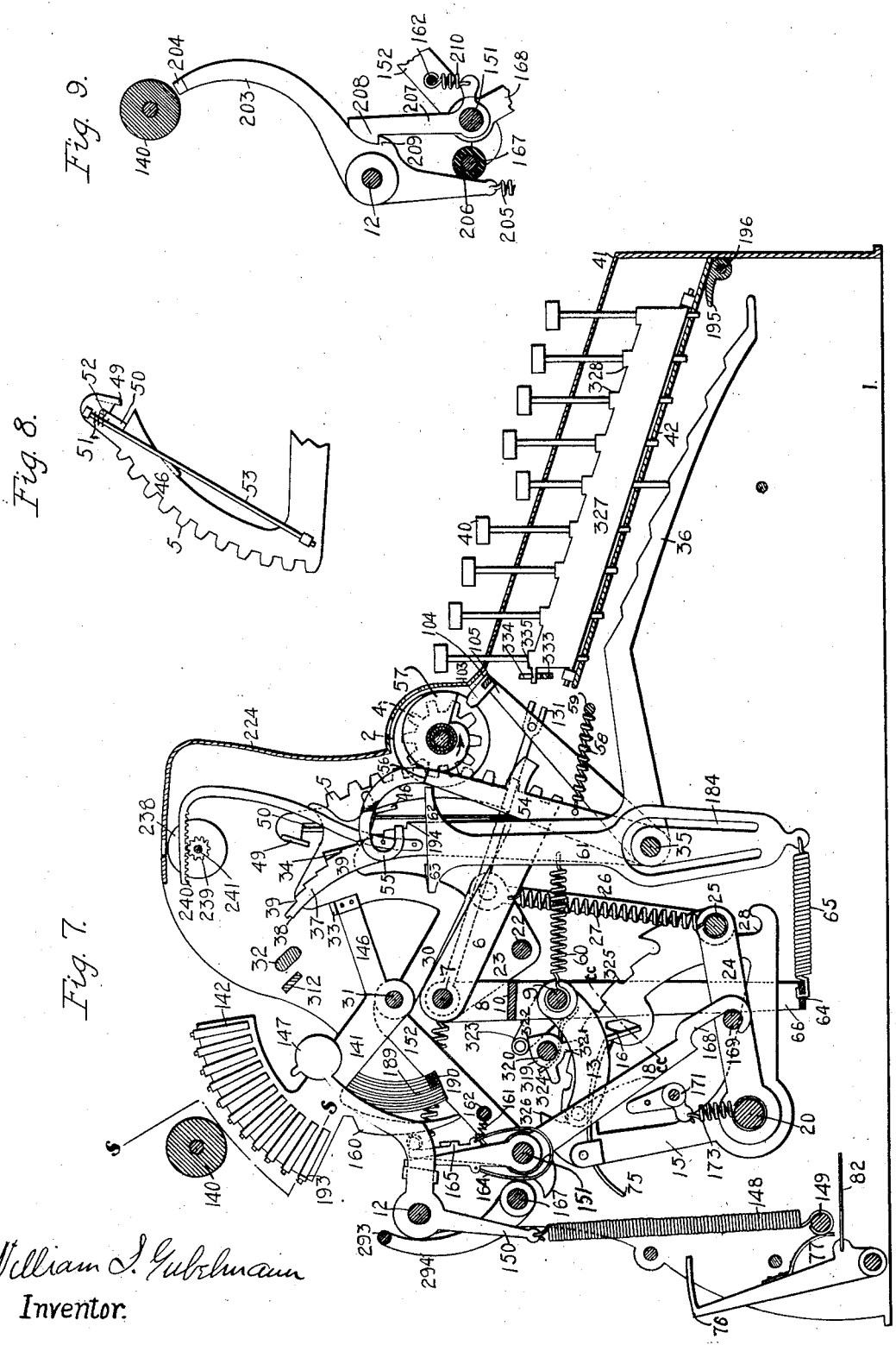
William S. Gubelmann
Inventor.

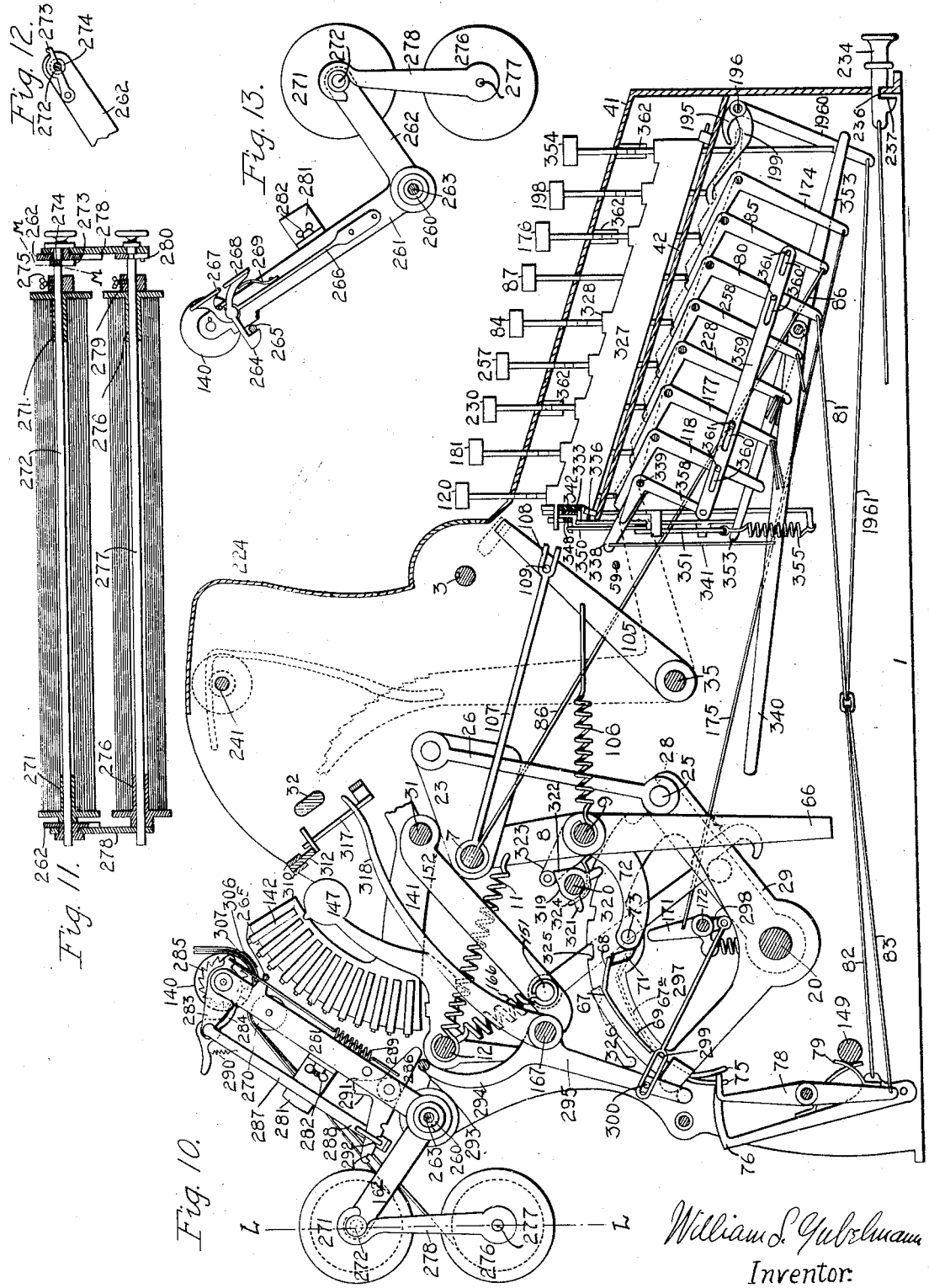

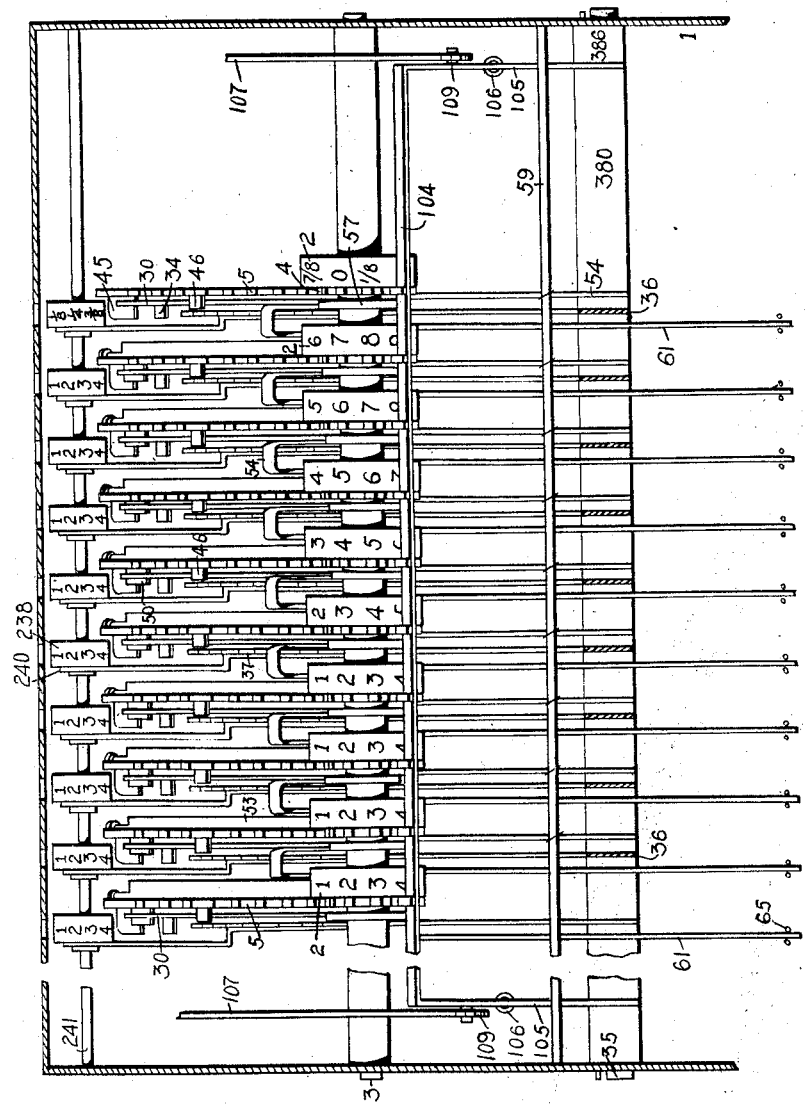

Jan. 7, 1930. W. S. GUBELMANN 1,742,522
ADDING AND RECORDING MACHINE
Original Filed Jan. 10, 1900  9 Sheets-Sheet 6
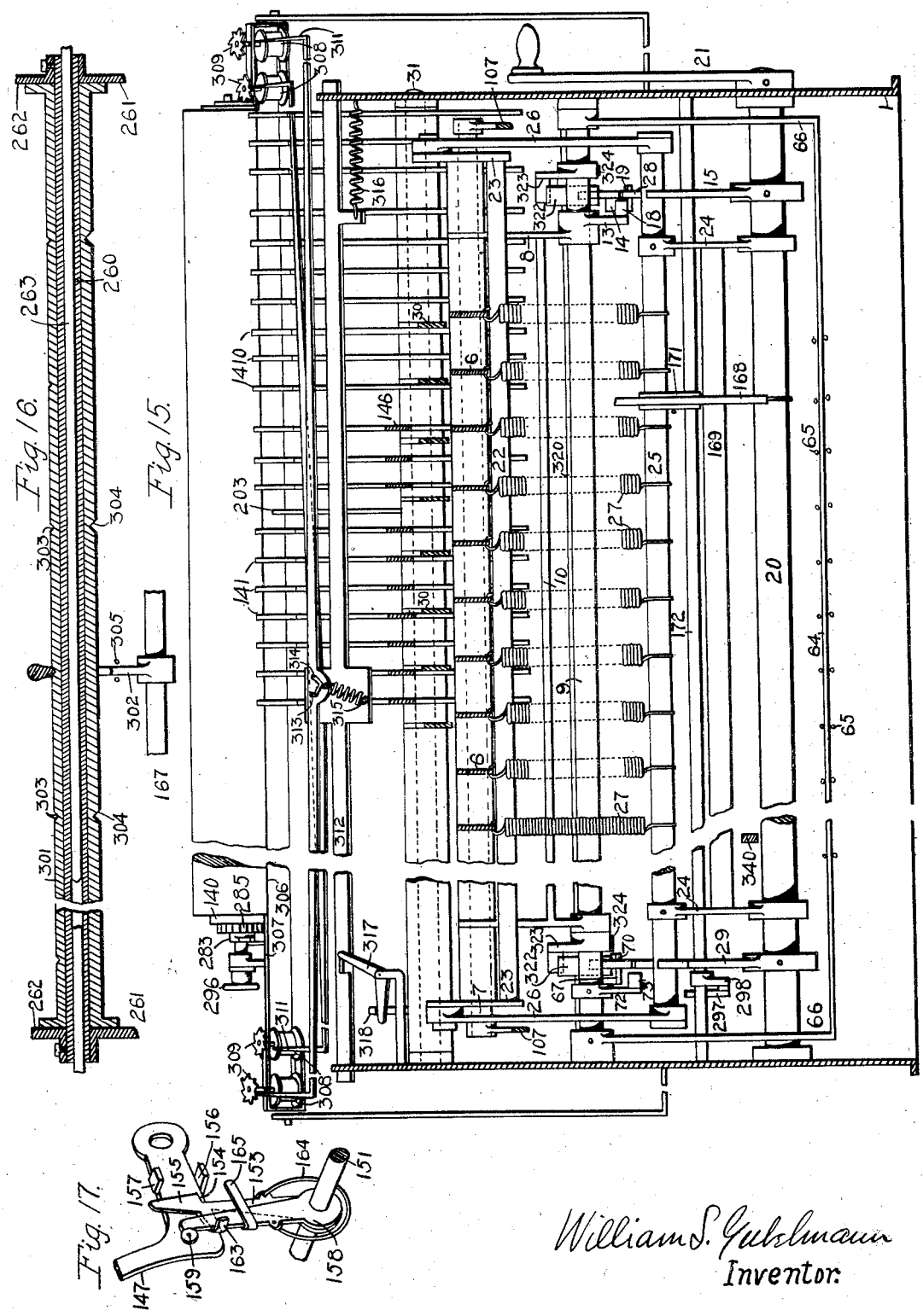
William S. Gubelmann
Inventor.

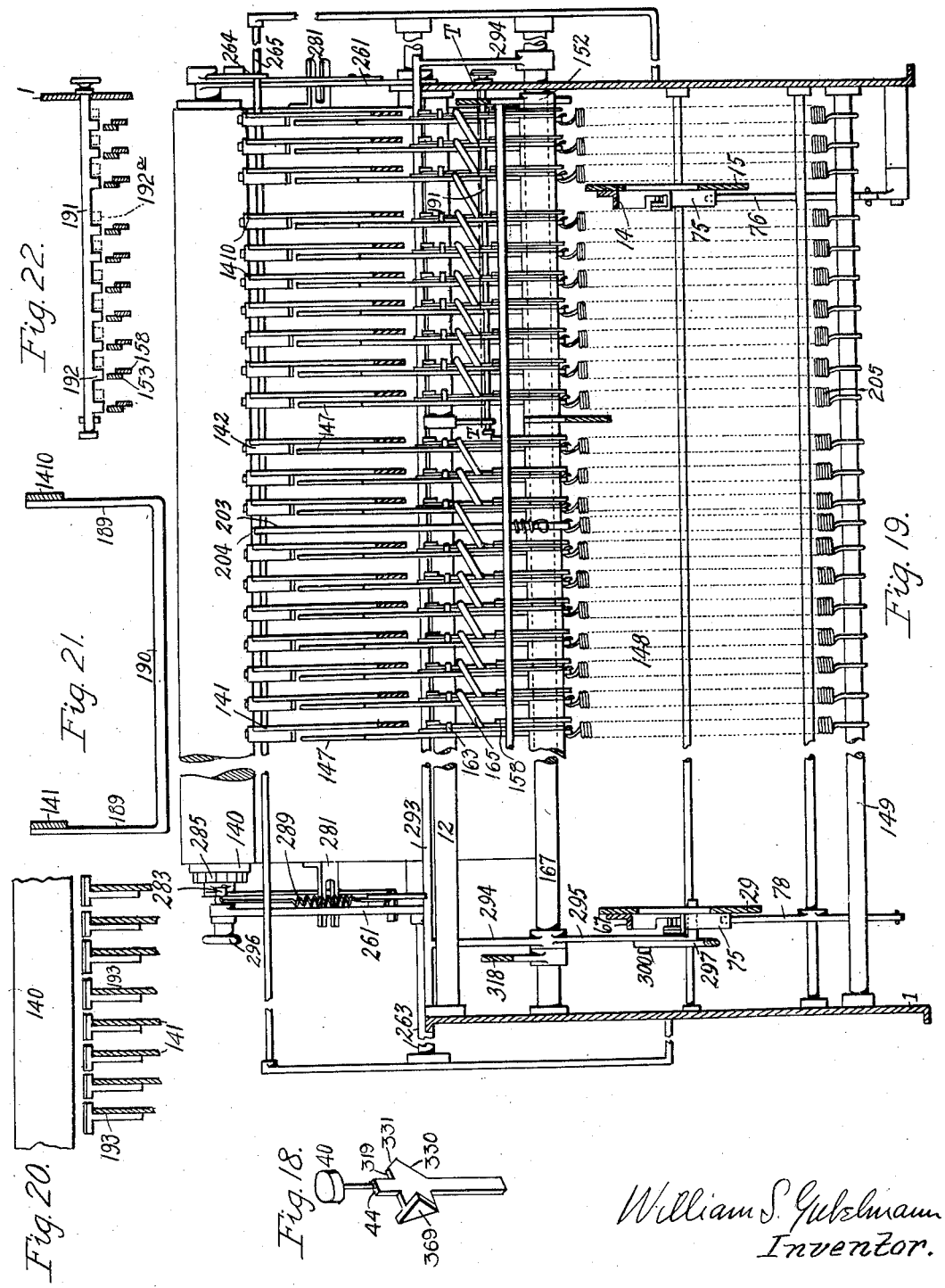

Jan. 7, 1930.   W. S. GUBELMANN   1,742,522
ADDING AND RECORDING MACHINE
Original Filed Jan. 10, 1900   9 Sheets-Sheet 8
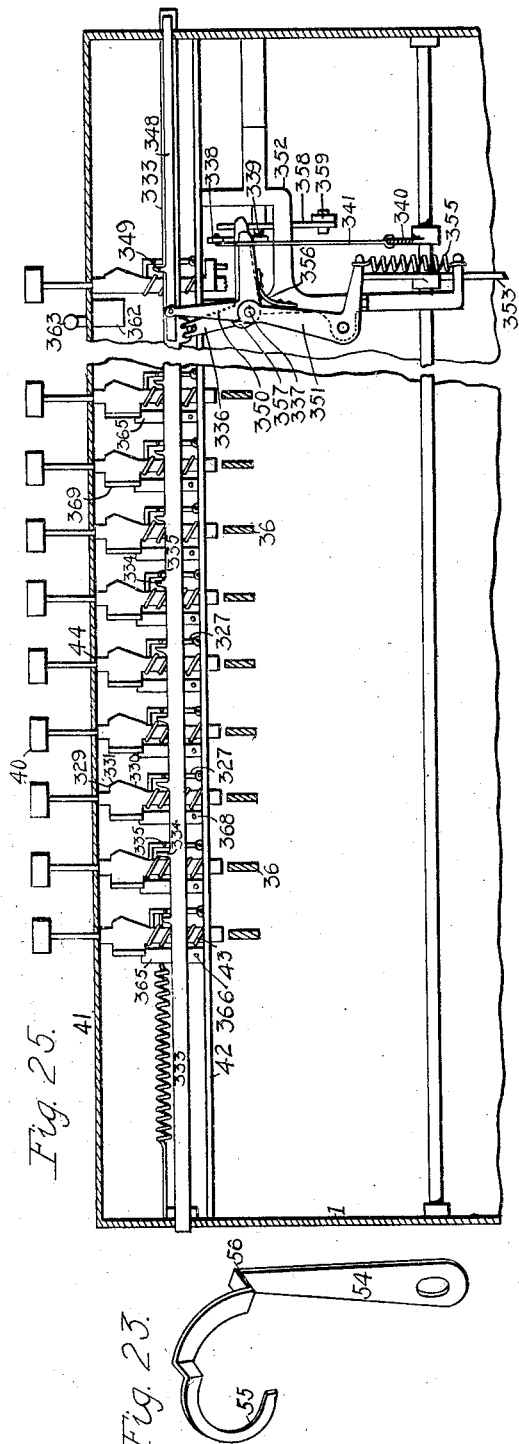
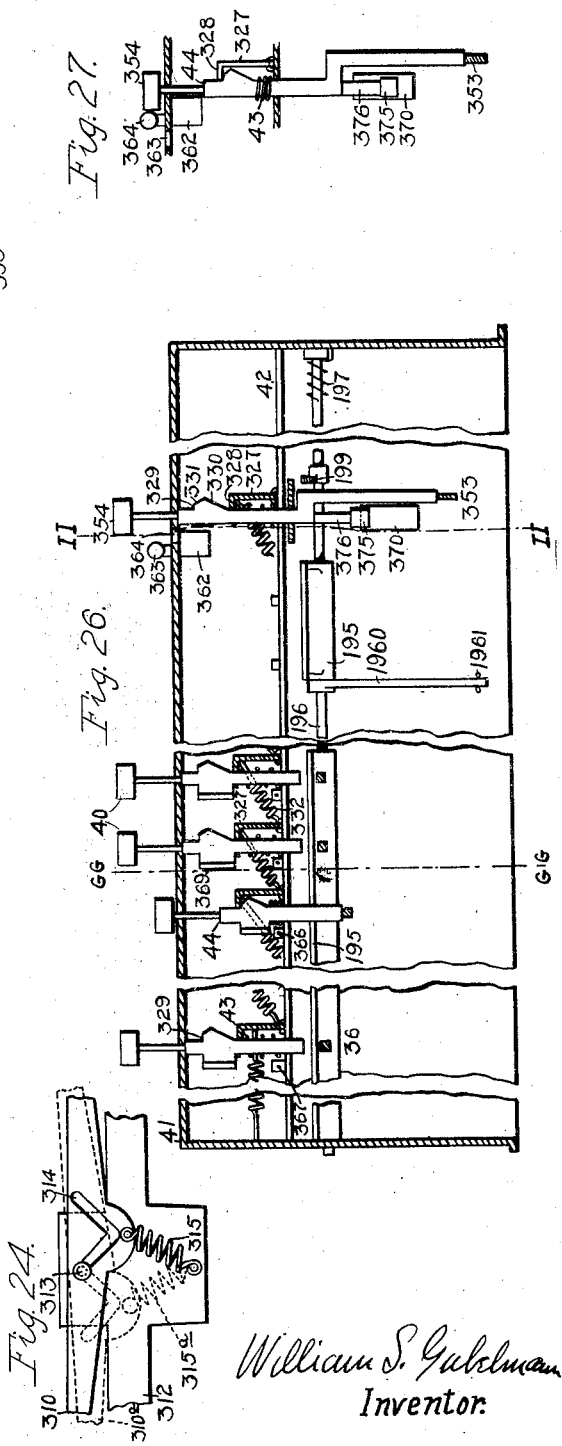

Jan. 7, 1930.    W. S. GUBELMANN    1,742,522
ADDING AND RECORDING MACHINE
Original Filed Jan. 10, 1900    9 Sheets-Sheet 9
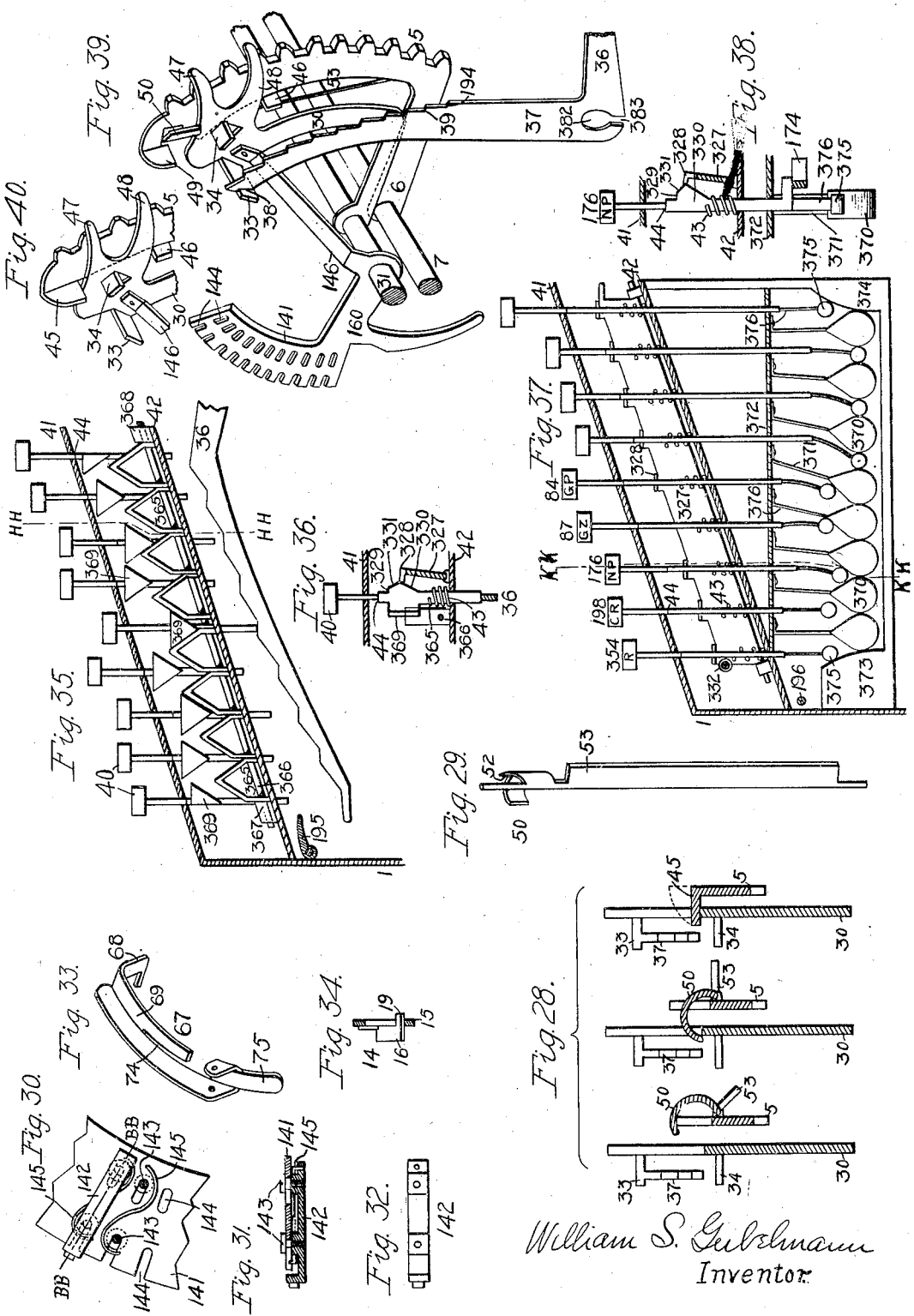
William S. Gubelmann
Inventor Patented Jan. 7, 1930

1,742,522

UNITED STATES PATENT OFFICE

WILLIAM S. GUBELMANN, OF BUFFALO, NEW YORK

ADDING AND RECORDING MACHINE

Original application filed January 10, 1900, Serial No. 1,004. Divided and this application filed July 30, 1917. Serial No. 183,398.

This application relates to adding and recording machines and is a division of my application, Serial No. 1,004, filed January 10, 1900 (eventuating in Patent No. 1,429,201, dated September 12, 1922). One of the objects of the invention forming the subject matter of this application is to provide novel and efficient mechanism for accumulating and recording items and for obtaining totals thereof. In this connection the invention includes new and improved differential mechanism, actuating mechanism for accumulator elements and type carriers, carrying mechanism, and mechanism whereby the setting of type carriers may be controlled in accordance with the totals standing on the accumulator elements. Another object is the provision of a novel indicating mechanism. Other and further objects will become apparent from the ensuing description and claims.

In the accompanying drawings consisting of nine sheets:

Figure 2 is a vertical longitudinal section of the same, taken substantially in line A—A, Figure 1, and showing the adding and recording mechanism of one column or set of keys in the normal or inoperative position.

Figure 3 is a fragmentary sectional elevation of the printing mechanism of one of the rows of keys viewed from the side opposite to that shown in Figure 2.

Figure 4 is a fragmentary sectional elevation taken in line B—B, Figure 1, and showing the devices whereby numbers are printed in duplicate.

Figure 5 is a horizontal section in line C—C, Figure 3.

Figure 6 is a vertical section in line D—D, Figure 3.

Figure 7 is a view similar to Figure 2 with the paper carrying device omitted and showing the parts of the adding and recording mechanism in a shifted position.

Figure 8 is a fragmentary elevation of one of the main registering gear segments viewed from the side opposite to that shown in Figures 2 and 7.

Figure 9 is a fragmentary longitudinal sectional elevation taken substantially in line I—I, Figure 1, and showing the preferred means for producing vertical ruling on the sheet which receives the record.

Figure 10 is a longitudinal sectional elevation, taken substantially in line K—K, Figure 1, and showing particularly the paper carriage and the mechanism whereby the different parts of the machine may be thrown into and out of gear.

Figure 11 is a vertical transverse section, on a reduced scale, taken in line L—L, Figure 10, and showing the means for supporting two rolls of web-paper, for manifold recording.

Figure 12 is a fragmentary vertical section, taken in line M—M, Figure 11, and showing the means for holding the paper spindle in place.

Figure 13 is a detached side elevation of the paper carriage, viewed from the side opposite to that shown in Figure 10.

Figure 14 is a fragmentary vertical section, taken substantially in line N—N, Figure 2.

Figure 15 is a vertical section, taken substantially in line P—P, Figure 2.

Figure 16 is a fragmentary transverse section, taken in line Q—Q, Figure 2, and showing the means for adjusting the paper carriage lengthwise of the line of printing.

Figure 17 is a fragmentary perspective view of the hammer operative mechanism.

Figure 18 is a perspective view of one of the registering keys.

Figure 19 is a vertical transverse section taken in line R—R, Figure 2.

Figure 20 is a fragmentary section taken in line S—S, Figure 7, and showing the preferred means for producing horizontal or cross ruling on the surface which receives the record.

Figure 21 is a fragmentary cross section showing the means for connecting one of the main printing segments with its companion duplicate printing segment.

Figure 22 is a fragmentary horizontal section taken in line T—T, Figure 19, and showing the means whereby the duplicate printing segments may be rendered operative or inoperative.

Figure 23 is a perspective view of one of the trip arms forming part of the device whereby a number is carried from a lower to a higher dial.

Figure 24 is a fragmentary view, on an enlarged scale, of the mechanism for automatically reversing the ink ribbon of the recording mechanism when the same reaches the end of its movement in either direction.

Figure 25 is a fragmentary transverse sectional elevation taken in line U—U, Figure 2, and showing the mechanism for holding the keys in their depressed position and for releasing the same.

Figure 26 is a fragmentary transverse sectional elevation, taken in line V—V, Figure 2.

Figure 27 is a similar view showing one of the keys locked in a depressed position.

Figure 28 is a fragmentary horizontal section, on an enlarged scale, taken in line AA—AA, Figure 2.

Figure 29 is a perspective view of one of the latches forming part of the mechanism, whereby the addition of numbers is carried from each registering dial to the next higher dial.

Figure 30 is a fragmentary sectional side elevation of one of the printing segments showing the means for mounting the type movably thereon.

Figure 31 is a cross section of the type segment taken in line BB—BB, Figure 30.

Figure 32 is a side view of one of the type carriers viewed from the side opposite to that shown in Figure 30.

Figure 33 is a perspective view, showing one of a pair of substantially similar cams, one of which serves to shift the dial operating segments into their operative position and the other one of which serves to shift the parts into position for printing a total of the added numbers.

Figure 34 is a vertical section in line CC—CC, Figure 7.

Figure 35 is a fragmentary longitudinal sectional elevation, taken in line GG—GG, Figure 26, and showing the mechanism whereby only one key can be held in a depressed position at a time.

Figure 36 is a cross section in line HH—HH, Figure 35.

Figure 37 is a fragmentary longitudinal sectional elevation, taken in line II—II, Figure 26, and showing the mechanism whereby a group of keys may be held in a depressed position and this group will be released if any keys in excess of the proper number are depressed.

Figure 38 is a cross section in line KK—KK, Figure 37.

Figure 39 is a fragmentary perspective view showing the key lever, the gear segment, the controlling arm, and the printing segment of one of the higher columns of numbers.

Figure 40 is a fragmentary perspective view of the units gear segment and controlling arm of the adding mechanism.

Like letters of reference refer to like parts in the several figures.

Figure 1:
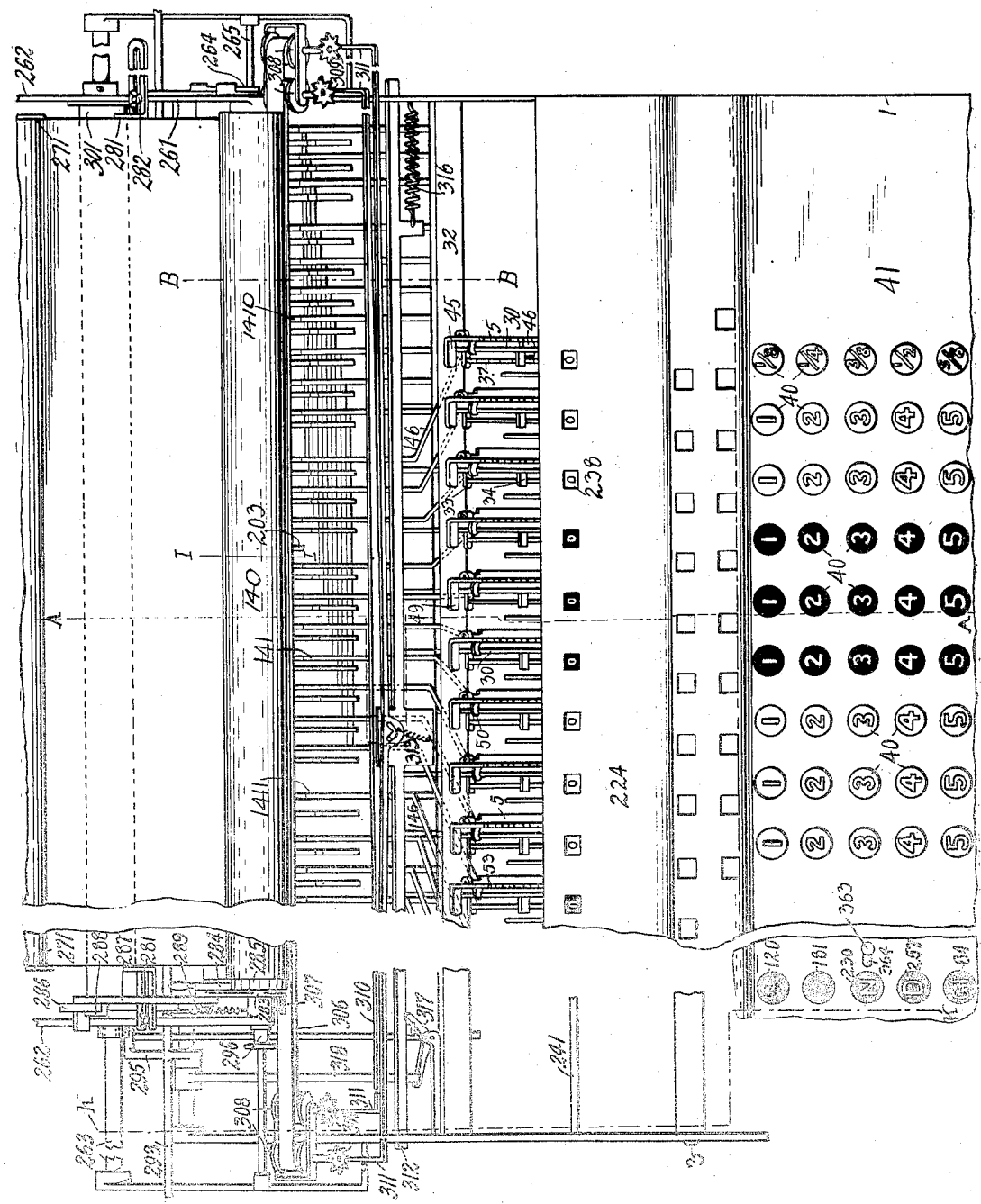
Figure 1 is a fragmentary top plan view of my improved adding and recording machine.

General construction 1 represents the main frame of the machine which may be of any suitable construction so as to support the working parts of the machine.

2, Figures 2, 7 and 14, represents a number of dials which register the total of the numbers which are added together. These dials consist preferably of cup-shaped wheels which are numbered on their peripheries and are mounted in their proper order on a transverse dial shaft 3, which is journaled in bearings on the main frame, the dials being so arranged that the dial representing the lowest number is arranged on the right hand end of the series and the dials representing the successively higher numbers being arranged successively in their order toward the left from the dial representing the lowest number. The lowest or right hand dial is preferably divided on its periphery into one-eighths so as to indicate fractions of a cent in eighths, and the remaining dials are graduated on their periphery according to the decimal system, into tenths. As shown in the drawings ten total dials are shown and extend from fractions of a cent to tens of millions, but if desired, additional dials may be added to the right and to the left of the series, if it is desired to register smaller divisions of a cent or more than tens of millions. Each of the dials 2 is provided on its left-hand side with a gear pinion 4, which is rigidly connected therewith, as shown in Figures 2, 7 and 14. The pinion of the fraction wheel has eight teeth while the pinions of the remaining dials are each provided with ten teeth. 5 represents the registering gear segments, one of which is provided for each of the dials 2 and is adapted to engage with the pinion thereof, for operating the respective dial. Each of these gear segments is arranged in rear of its companion gear pinion and is provided at its lower end with a rearwardly projecting arm 6 which is pivoted loosely on a transverse supporting rod 7. This rod is mounted with its ends on the upper ends of two rock arms 8 which turn loosely with their lower ends on a transverse rock-shaft 9. The rod-arms 8 are connected by a transverse bar 10 which compels the two arms to move back and forth together. In the normal position of the gear segments when the machine is at rest these segments are retracted rearwardly out of engagement from the dial pinions of the dials and the segments are elevated so that their lowermost teeth are opposite the spaces between the adjacent teeth of the dial pinions, these spaces being in line with the pivots of the pinions and the gear segments.

The gear segments are yieldingly held backwardly out of engagement with the dial pinions by means of springs 11 (Fig. 10) connecting the rock-arms 8 with a stationary part of the frame.

Figure 10 shows one of the springs 11 connecting one of the rock-arms 8 with a transverse stationary bar 12 in the rear part of the machine. The gear segments are moved forwardly so that their teeth engage with the dial pinions 4 by means of a shifting rock-arm 13 (Fig. 2), which is preferably secured to the right hand rock-arm 8 and projects rearwardly. Upon raising the shifting rock-arm 13, the rock-arms 8 are swung forwardly and the gear segments 5 are engaged with the dial pinions, while upon swinging the shifting rock-arms downwardly, the rock-arms 8 are swung readwardly and the gear segments are disengaged from the dial pinions.

14 represents a cam whereby the gear segments are engaged with the dial pinions. This cam is mounted on the upper portion of a vertically swinging rocking frame 15 which is arranged on the right hand side of the machine. This cam is provided at its front end with an incline or cam face 16 and at its rear end with a concentric face 17. When the cam is in its rearmost or retracted position, its incline stands in rear of a roller or projection 18 on the rear end of the shifting arm 13, as shown in Figures 2, 7 and 15. Upon swinging the rocking frame 15, so that the cam 14 moves forwardly, the incline of the latter engages underneath the roller 18 and raises the arm 13, thereby moving the arms 8 forwardly. The throw of the incline 16 is just sufficient to engage the teeth of the gear segments with the dial pinions. When the roller 18 has been raised to the top of the incline, the concentric portion of the cam engages with the roller during the continued forward movement of the cam and the latter does not shift the gear segments any further forward.

When the rear end of the concentric face 17 of the cam passes forwardly from underneath the roller 18, the constant pull of the springs 11 causes the rock-arm 13 to be depressed and the rock-arms 8 to be moved rearward, thereby disengaging the gear segments from the dial pinions. Upon now moving the cam 14 backwardly together with the rocking frame 15, this cam does not affect the arm 13 and the parts connected therewith, but is affected by said arm at the last portion of the backward movement of the cam, at which time the back or lower side of incline 16 engages with the roller 18 which lifts said incline, and at the end of the backward movement of the cam, the latter clears said roller and drops behind the same, as shown in Figure 2, preparatory to again raising the roller 18 and connecting parts during the next forward movement of the cam 14.

For the purpose of permitting the front end of the cam to rise so as to clear the roller 18, this cam is pivoted at its rear end to the rear portion of the rocking frame 15. The upward and downward movement of the front end of the cam is limited by means of a lug 19 projecting from the side of the cam and engaging with a slot in the adjacent part of the rocking frame 15, as shown in Figures 15 and 34.

The rocking frame 15 is secured with its lower portion to a transverse rock-shaft 20 journaled in the main frame and provided outside of the frame with a hand crank 21, as shown in Figure 15, whereby this shaft is rocked and the parts connected therewith are operated.

The gear segments 5 are raised to their highest position by means of a return or lifting bar 22 which extends transversely underneath all of the arms 6 of the gear segments and which is connected loosely at its rear ends with the transverse rod 7 by lifting plates 23. 24 represents two shifting arms which are mounted loosely at their rear ends on the rock-shaft 20 and which support at their other ends a transverse bar 25 which transverse bar is connected at its ends, by two links 26, with the lifting plates 23, whereby upon raising the shifting arms 24, the lifting bar 22 is caused to raise the gear segments and the other parts connected therewith resting on said bar. Upon depression of the transverse bar 25, the lifting bar 22 is moved downwardly and the gear segments resting thereon are permitted to move downwardly with the bar until the segments are arrested.

Each of the gear segments is yieldingly held in contact with the lifting bar 22 by a spring 27 which connects the arm of the segment with the transverse bar 25. If the downward movement of the gear segment is arrested while the shifting arms 24 continue to move downwardly, the lifting bar 22 is moved away from the underside of the arm of the gear segment and the spring 27 is strained. The transverse bar 25 is arranged at one end in a segmental notch 28 formed in the front part of the rocking frame 15, shown in Figures 2, 7 and 15, and its opposite end is arranged in a similar segmental notch 28, formed in a rocking frame 29 (Fig. 15) which is secured to the operating shaft 20 on the left-hand side of the machine. The rocking frames 15 and 29 together with the operating shaft 20 constitute the main or universal operating frame of the machine.

When the machine is at rest, as shown in Figure 2, the transverse bar 25 engages with the front side of the notches 28 in the rocking frames 15 and 29. Upon turning the rocking shaft 20 forwardly by means of its handle 21 in the direction of the arrow, Figure 2, the rocking frames are moved forwardly during the first part of the movement independent of the transverse bar 25. The latter remains at rest until the inclined front end 16 of the cam 14 has raised the arm 13 and moved the gear segments into engagement with the dial pinions, during which movement the rocking frames move idly the extent of their notches 28 along the ends of the bar 25 without disturbing the latter. After the gear segments have been engaged with the dial pinions, the continued forward movement of the rocking frames causes the rear ends of their notches 28 to engage with the bar 25 and depress the same, thereby causing the lifting bar 22 to be moved downwardly and strain the springs 27. This causes all of the gear segments which are free, to be moved downwardly and to continue their downward movement until they are arrested. During the downward movement of the gear segments, while they are in engagement with the dial pinions, the latter and the dials connected therewith are turned in the direction of the arrow, Figure 7, until the downward movement of the segments is arrested. The extent which each dial is turned depends upon the position in which the downward movement of its operating segment is arrested. After the segments have been arrested in their downward movement, they remain in this position while the rocking frames complete their forward movement. At the end of the forward movement of the rocking frames, the roller 18 of the rock arm 13 drops off from the rear end of the concentric part of the cam 14, thereby allowing the springs 11 to pull the gear segments rearwardly out of engagement with the dial pinions.

Upon now turing the rock-shaft 20 backwardly by means of the handle 21, the rocking frames are moved backwardly until the front ends of the notches engage with bar 25. When the latter is so engaged it is moved backwardly with the rocking frames to the end of their rearward movement which causes the transverse bar 25 to lift the lifting bar 22 and the gear segments which have been depressed, into their highest or normal position. During this upward movement of the depressed gear segments they are out of engagement with the dial pinions, whereby the dials are not turned backwardly with the segments, but remain in their shifted position.

30 represents a number of elbow-shaped controlling arms, which form part of the devices whereby the downward movement of the registering gear segments is controlled. One of these arms is arranged along the lefthand side of each gear segment and consists of an upright front part and a horizontal lower part which extends rearwardly from the lower end of the upright part, thereby leaving a clear space in rear of the upright part of the controlling lever as represented in Figures 1, 2, 7, 14, 39 and 40. The rear end of the lower part of each controlling arm is mounted loosely on a transverse supporting bar 31, while the upper end of its front or upright part is loosely connected with the upper portion of its companion gear segment. This loose connection permits the controlling arm and the gear segment to swing freely about their individual axes, which are arranged parallel but out of line, and also permits the gear segment to move forward and backward into and out of engagement with its companion dial pinion. In the uppermost position of the controlling arms the same bear with their upper ends against a transverse stop bar 32, as shown in Figure 2, which limits the upward movement of these arms. Each controlling arm is provided on the rear part of its upper end with a locking lug 33, and on the front part of its upper end with a stop lug 34, both of which lugs project toward the left and are preferably stamped out of one piece with the controlling arm.

The operation of the registering devices is controlled by a number of elbow-shaped key levers which are arranged side by side and pivoted to a transverse supporting rod 35. Each key lever is provided with a lower actuating arm 36 which projects forwardly and an upper stop arm 37 which projects upwardly along the left hand side of one of the controlling arms and gear segments, as represented in Figures 2, 7, 14 and 39. Each of these key-levers is provided on the rear side of its stop arm with a locking shoulder 38 which is adapted to engage with the locking lug 33 of the controlling arm when the latter is elevated into its highest position and the key-lever is in its fully retracted position, as shown in Figure 2. When the parts are in this position, the key lever holds the controlling arm against downward movement and the latter holds the gear segment against downward movement. If the gear segment while so held against downward movement is moved forward into engagement with the adjacent dial pinion, and the rocking frames are turned forwardly for depressing the gear segment, the spring 27 of this segment will be strained without, however, shifting the segment. At the end of this forward movement of the rocking segments, the roller 18 of the rock arm 13 drops off from the rear end of the cam 14, the gear segment is moved rearwardly out of engagement from the dial pinion and then the rocking frames move backwardly without having shifted the dial.

The upper arm of each key lever is provided on its front side with a vertical series of differential stop shoulders 39, which are arranged step fashion and extend from the upper end of this arm downwardly and forwardly thereon or in other words the stop shoulders 39 are arranged radially out of line with one another and different distances from the pivot of the key lever. These stop shoulders of the key lever are adapted to be moved forwardly into the path of the stop lug 34 on the controlling arm. The stop shoulders are arranged different distances from the stop lug 34 of the controlling arm, so that by moving different stop shoulders of the key lever into the path of the stop lug of the controller arm, the latter and the gear segment connected therewith may be arrested at different points in their downward movement. The uppermost stop shoulder of the key lever is most remote from the stop lug of the controlling arm and therefore requires the greatest forward movement of the key lever, in order to bring this stop shoulder into the path of this stop lug.

The stop shoulders of the key lever are so arranged that the distance from the stop shoulders to the path of the stop lug 34 gradually grows less from the uppermost stop shoulder to the lowermost stop shoulder. The relative position of the different stop shoulders of the key lever is such that when its locking shoulder 38 remains in engagement with the locking lug 33 and the gear segment is simply moved into and out of engagement with its dial pinion, the latter remains at zero, if the same has not been previously moved. But when the key lever has been moved forwardly, so as to disengage its locking shoulder from the locking lug and moves one of its stop shoulders into the path of the stop lug of the controlling arm, the latter arm and gear segment connected therewith will be moved downwardly, upon moving the rocking frames forwardly, until the stop lug of the controlling arm strikes the respective stop shoulder of the key lever which stands in its path, as represented in Figure 7, whereby the gear segment while turning in engagement with the adjacent dial gear pinion, turns the same forward. By turning the key lever forward more or less and moving one or the other of its stop shoulders into the path of the stop lug 34 of the controlling arm, the distance which this arm descends can be varied, thereby varying the number of spaces which its gear segment turns the adjacent dial.

Number key mechanism 40 represents the number keys whereby the key levers of the registering and recording mechanism are operated, and which are guided with their depending stems in the top 41 and bottom 42 of the key-board. As shown in the drawings, nine longitudinal columns of these keys are arranged transversely side by side. The first column on the right hand side of the machine contains seven keys and represents fractions of one-eighth of a cent, the next column toward the left contains nine keys and represents cents and the remaining columns of keys toward the left each contains nine keys and represents progressively higher orders of numbers according to the decimal system, so that the registering keys in the last or left hand column represent hundreds of thousands of dollars.

The lowest numbers of the several columns of keys are arranged transversely in a row on the rear part of the key-board and the corresponding higher numbers of the several columns are arranged likewise in transverse rows and progressively in their order toward the front end of the key-board.

Each of the registering keys is yieldingly held in an elevated position by a spring 43 (Fig. 25) surrounding the stem of the key and connected at its upper end to the key and bearing with its lower end against the bottom of the key-board. The upward movement of each key is limited by a shoulder 44 formed on the upper part of its stem and engaging with the underside of the top of the key-board, as represented in Figures 25, 26, 36 and 37.

The downward movement of all of the keys is substantially the same, but the arrangement of each column of keys lengthwise of the lower actuating arm of each key lever causes the keys to bear against the lever at different distances from its pivot so that by depressing different keys the same distance, the key lever will be turned different angular distances. The keys having the lowest numbers bear against their respective key levers nearest the pivot and consequently the levers are thereby thrown the greatest distance, and the uppermost stop shoulders are shifted into the path of the stop lug 34 of the respective controlling arms. The throw of each key lever upon depressing any one of its keys is so adjusted, that the proper stop shoulder on its upper arm is moved into the path of the stop lug 34 of the controlling arm and the downward movement of the respective gear segment is arrested after having turned the adjacent dial gear pinion a number of spaces corresponding to the number of the key which is depressed.

Loose connection for segments

The loose connection between each controlling arm and its gear segment, heretofore referred to, is shown in its simplest form in the connection between the controlling arm and the gear segment, which are controlled by the initial or lowest column of registering keys. As shown in Figures 1, 14, 28 and 40, the loose connection between the controlling arm and the gear segment of the lowest registering device consists of upper and lower guide lugs 45 and 46 arranged on the upper end of the segment and bearing against the upper and lower guide faces 47 and 48, which are formed on the upper end of its companion controlling arm. As the controlling arm and segment rise and fall, the guide lugs of the segment slide back and forth on the guide faces of the arm. The guide faces are so constructed that the back and forth movement of the segment on the arm is radial with reference to the dial pinion in all positions of the segment. By so forming the guide faces of the arm, the gear segment can be engaged with and disengaged from the dial pinion in all positions of the segment without disturbing the position of the dial pinion. The construction of the loose connections between the controlling arms and gear segments of all of the higher registering devices above the fractional registering device are combined with carrying devices, whereby each registering dial, upon making one complete turn, causes the next higher dial to be turned forward one space, thereby carrying up a number from one order to the next higher order. The loose connections between the controlling arms and the segments and the carrying mechanism of the higher registering devices are constructed as follows:—

As shown in Figures 1, 2, 7, 14 and 40, each controlling arm is provided at its upper end with upper and lower guide faces 47 and 48 and its lower guide face is engaged by a lower guide lug 46 on the adjacent gear segment, the same as in the coupling between the controlling arm and segment of the initial registering device. The gear segments of the higher registering devices are each provided with an upper guide lug 49 which is adapted at times to bear against the upper guide face 47 of the companion controlling arm in substantially the same manner in which the upper guide lug 45 of the fractional gear segment bears against its companion arm, the only difference being that the upper guide lugs 49 of the higher gear segments are held out of engagement and separated by a space from the upper guide face of the companion arm when no number is carried from a lower to a higher registering device. The upper guide lug 49 is held in this elevated position above the adjacent guide face by a rocking latch 50 which is arranged in a notch in the rear side of the gear segment and which normally projects toward the left and engages with the upper guide face 47 of the adjacent controlling arm, as shown in Figures 2, 28 and 40.

During the ordinary up and down movement of each higher controlling arm and gear segment, the latter is guided by its lower guide lug 46 and the locking latch 50 engaging with the lower and upper faces of the adjacent arm, this movement being the same as the movement of the controlling arm and gear segment of the fractional registering device. Normally the downward movement of the controlling arm is determined by the position of its companion key lever and this arm in turn controls the extent of the downward movement of the gear segment. When, however, the locking finger 50 is withdrawn out of engagement from the upper guide face 47 of the arm, the companion gear segment is capable of moving downward independently of the arm until the upper guide lug 49 engages with the upper guide face of the arm. The extent of this independent movement of the gear segment with reference to its companion arm is equal to one tooth or space of the segment, so that by this means the gear segment is enabled to turn the dial pinion one space more than the position of the key lever permits the same to move.

The withdrawal of the locking latch of each higher registering device is controlled by the next lower registering device and the withdrawal of each latch is effected when the next lower registering device has made one complete turn and arrived at zero. Each of the locking latches is pivoted on the right hand side of its adjacent gear segment, so as to turn transversely with reference to the latter. The latch is turned toward the left into its operative position by a spring 51, (Fig. 8) the movement in this direction being limited by a shoulder 52 arranged on the latch and bearing against the right hand side of the gear segment, as shown in Figure 8. 53 is an upright trip plate connected with the lower end of each latch and arranged normally at right angles or nearly so to the adjacent gear segment, when the latch is in its operating position. 54 represents a number of upright trip arms, each of which is controlled by a lower registering device and which turns the locking latch of the next higher registering device into an inoperative position. This arm is mounted loosely with its lower end on the supporting bar 35 and is provided at its upper end with a rearwardly and forwardly projecting hook 55, and in front and below said hook with a bend forming a bearing finger 56 (Fig. 23). 57 represents trip cams arranged on the left-hand side of each registering dial pinion and connected with the adjacent pinion and dial, but separated from the pinion by an intervening space or groove. The face of each of these cams begins at its lowermost point near the axis thereof and then extends outwardly in a spiral line terminating with its highest point radially in line with its lowermost point with which it connects abruptly. The trip cam of the fractional registering device has its face divided into eight parts, each part of which is arranged one-eighth of a space further from the center of the cam than the preceding part, while the trip cams of the higher registering devices each has its face divided into ten parts, each part being arranged one tenth of a space farther from the axis of the cam than the preceding part. Each of the trip arms 54 extends upwardly along the right-hand side of the trip cam of a lower registering device and its shoulder 56 engages with the face of this cam, while the hook 55 at its upper end extends toward the left and is adapted to engage with the trip plate 53 of the next higher registering mechanism. In the initial position of each trip arm, its shoulder 56 engages with the lowest part of its trip cam, as represented in Figure 2. As the trip cam is turned in the direction of the arrow, Figure 2, at the same time that its dial and gear pinion are moved forwardly by the adjacent gear segment during the adding operation the trip arm is moved backwardly by the gradually rising face of the trip cam. During this backward movement of the trip arm, its hook engages with the trip plate 53 of the next higher registering device and is deflected toward the right thereby, the hook being sufficiently elastic for this purpose. After the hook has passed in rear of said trip plate, the hook owing to its resilience springs back to its normal position, so as to stand behind said trip plate. When the shoulder of the trip arm reaches the highest part of the face on the trip cam the trip arm has been shifted to its rearmost position. Upon now turning this cam forwardly another space together with its companion dial and pinion, the highest part of the cam is carried from underneath the shoulder of the trip arm and the latter is moved forwardly over the abrupt face of the cam until its shoulder 56 again engages with the lowest part of the cam face. During this movement of the trip arm, its hook strikes the rear side of the trip plate 53 of the next higher registering mechanism and turns the same forwardly, as shown in Figure 28, thereby disengaging the locking latch from the adjacent controlling arm and permitting the gear segment carrying the trip plate to move forward one space. The forward movement of the trip arm is effected when the dial with which its trip cam is connected has made one complete rotation and again stands at zero, whereby the addition represented by this complete rotation is carried to the next higher registering device. The forward movement of the trip arm is effected quickly by a spring 58, which connects with a stationary cross bar 59 arranged in front of the trip arms. The trip plate 53 of each registering device is so arranged and is of such length that the hook of the next lower trip arm can engage with the rear side of the plate, for disengaging its latch in any position of the gear segment carrying the plate. If a gear segment is locked in its highest position by reason of none of its companion keys having been depressed, the withdrawal of its latch from the controlling arm simply permits the gear segment to drop one space and turn its companion dial pinion forward one space, while in engagement therewith, the movement of this dial representing one number carried up from the next lower dial. If any one of the keys of the key levers has been depressed, so as to release the gear segment and permit the same to move downwardly for effecting an addition, and if during this time the next lower registering device has made a complete turn, so as to require the carrying up of a number from the next lower registering mechanism, the latch of the higher registering device will be withdrawn while the same is effecting its addition, thereby causing the segment to descend and turn its dial one space in addition to the spaces corresponding to the depression of its respective key.

When the locking latch has been withdrawn so as to permit a gear segment to move downwardly one space farther than its controlling arm, the latch remains in this position during the subsequent upward movement of the arm and the segment until the upward movement of the arm is arrested by striking the stop bar 32 and the gear segment continues its upward movement independent of the arm the extent of one space. The gear segment has now reached its highest position and its latch is again swung automatically by its spring over the controlling arm. The controlling arm and gear segment now remain in this relative position until another number is to be carried up from the next lower registering device.

When the controlling arm has been retracted to its highest position, the adjacent key lever is moved into its normal retracted position, so that its locking shoulder 38 engages with the locking lug 33 of the controlling arm and locks the latter against downward movement. The return movement of each key lever is preferably effected by a spring 60 which connects the upper arm of the key lever with the transverse shaft 9, as shown in Figures 2 and 7, or some other convenient part of the machine. The lower guide lug of the gear segment compels the arm to rise with the gear segment and avoids displacement of these parts with reference to each other, and also serves as a stop to limit the upward movement of the gear segment.

The gear pinion and the co-operating gear segment of the fractional registering device are so constructed that the fractional dial makes one rotation whenever it is moved forward eight spaces. After the fractional dial has made one rotation the whole number represented by this rotation is transferred by the first carrying device from the registering mechanism of the fractional dial to the next higher registering device which represents cents. The complete turns of each of the following registering devices are in like manner carried or transferred to the next higher dial by the respective carrying device. The dial which records the highest number, in this instance the millions, is preferably operated only by the adjacent carrying device of the next lower dial and is incapable of being operated directly from the key-board because it is not provided with a key operating mechanism.

The mechanism whereby the dials are all turned back to zero or the place of beginning after the addition of numbers has been completed is constructed as follows:

61 (Figs. 2 and 7) represents a series of feeling rock levers which are adapted to shift the key levers, so as to permit the gear segments to descend the proper distance for re-setting or restoring the registering dials to zero. One of these shifting levers is mounted loosely on the supporting bar 35 adjacent to the left hand side of each of the key levers and is provided on its upper arm with a forwardly projecting feeling finger 62 and with a shifting finger 63 which extends behind the upper arm of the adjacent key lever. The feeling levers have their fingers arranged in rear of the cams 57 and each of these levers is turned so that its upper arm moves backwardly by the upper arm of the adjacent key lever engaging with the shifting finger 63 of the feeling lever. 64 represents a transverse pull bar arranged in rear of the lower arms of the feeling levers and connected with each of the latter by a pull string 65, as represented in Figures 2, 7 and 15. This pull bar is connected at its ends to the lower end of two depending pull or rock arms 66, which are secured at their upper ends to the rock shaft 9, as shown in Figure 15. Upon turning this rock-shaft, so as to swing its depending pull arms backwardly the feeling levers are turned by means of the springs 65 so as to move the upper arms of these levers forwardly. This movement of the rock-shaft 9, is effected by a cam 67 (Figs. 10, 19 and 33), which is mounted on the left-hand side of the rocking frame 29 and which is constructed substantially the same as the cam 14 which is mounted on the rocking frame 15. As shown in Figures 10 and 19, this cam is pivoted at its rear end by a transverse pin to the rear portion of the rocking frame 29 and is provided at its front end with an incline or cam face 68 and in rear of the incline with a concentric face 69. The cam 67 can be raised and lowered with its front end into an inoperative or operative position, this movement being limited by means of a lug 70 arranged on the cam as shown in Figure 15 and projecting into a slot 71 in the adjacent rocking frame in the same manner in which the movement of the cam 14 is limited as shown in Figure 34.

72, Figures 10 and 15, represents a rearwardly projecting rock-arm secured to the rock shaft 9 and provided at its rear end with a roller or projection 73 which is adapted to be engaged by the cam 67 for turning the rock shaft 9. When numbers are being added with the machine, the cam 14 is depressed, as shown in full lines, Figure 2, so as to be in a position when moved forwardly by the rocking frame 15 to engage the roller on the arm 13, for moving the gear segments into engagement with the dial pinions, and during this time the cam 67 is lifted into the position shown in full lines, Figure 10, so that when the rocking frame 29 is moved forwardly, the cam 67 will clear the roller 73 of the rock arm 72 and not disturb the rock-shaft 9 and the parts connected therewith. If it is desired to restore all of the dials 2 to zero, the cam 14 is raised into its inoperative position, shown by dotted lines 14$^a$ in Figure 2, and the cam 67 is lowered into its operative position, as shown by dotted lines 67$^a$ in Figure 10. Upon now turning the rock-shaft 20 by hand so as to move both rocking frames 15 and 29 forwardly, the cam 14 passes over the roller 18 of the arm 13 without disturbing the same, but the inclined front of the cam 67 engages with the roller 73 on the rear end of the rock-arm 72 and raises the same until this roller engages with the concentric part 69 of this cam. By this movement of the arm 72, the rock shaft 9 is turned in the direction for moving its depending arms 66 rearwardly and pulling the springs 65 rearwardly. This pull on the springs 65 causes the feeling levers to be turned until the feeling fingers of their upper arms engage with the spiral surfaces of the trip cams. After the feeling fingers bear against these cams, their movement is arrested and the continued backward movement of the pull bar 64 simply stretches the springs 65 until the bar reaches the end of its backward movement. The feeling finger of each feeling lever engages with that part of the surface of the adjacent trip cam which is directly opposite the feeling finger, and as these trip cams are turned with the adjacent dial they present different parts of their spiral surfaces to the opposing feeling fingers, which causes the forward movement of the upper arms of the feeling levers to be arrested in different positions when swung forwardly. During the forward movement of the upper arm of each feeling lever, its shifting finger 63 engages with the rear side of the upwardly projecting arm of the adjacent key lever and moves this arm forwardly. The construction of the parts is such that the spiral surface of the trip cam bears a definite relation to the step-shaped series of stop shoulders on the upper arm of the key lever.

When the feeling finger of the feeling lever, upon being moved forwardly, bears against the lowest part of the adjacent trip cam, the adjacent key lever is carried simultaneously forward with the feeling lever the greatest distance and its uppermost stop shoulder is carried into the path of the stop lug of the controlling arm. The succeeding parts of the spiral surface of the trip cam are so constructed that they rise progressively higher and arrest the forward movement of the feeling lever when the same has carried the adjacent key lever with its corresponding stop shoulder into the path of the stop lug of the controlling arm. This forward movement of the feeling lever and that of the upper arm of the key lever is gradually reduced as the progressively higher parts of the trip cam are presented to the feeling finger, and when the highest part of the trip cam is presented to the feeling finger, the feeling lever is prevented from moving forward at all and the upper arm of the key lever is not moved with its locking shoulder out of engagement with the locking stop of the controlling arm and consequently the companion gear segment connected therewith is held against downward movement. After the rocking frames 15 and 29 have been turned forwardly sufficiently to engage the several feeling fingers of the feeling levers with their respective trip cams, the rear ends of the segmental notches 28 in the rocking frames engage with the cross bar 25 and depress the same, thereby moving the lifting bar 22 downwardly and at the same time pulling down the springs 27. This downward pull on these springs causes each spring to pull its respective gear segment down as far as possible, and after the downward movement of the segment has been arrested the continued downward movement of the cross bar 22 together with the rocking frames simply stretches these springs until this bar reaches the end of its downward movement. If a gear segment is locked in its uppermost or zero position its spring 27 will be stretched its fullest extent, whereas, if a gear segment moves downwardly more or less before it is arrested by its shifted key lever, the spring 27 will be stretched less in proportion. This downward movement of the gear segments, which are free to move in this direction, takes place while the gear segments are in their retracted position and out of engagement from the dial pinions, so that the dials are not affected by this movement of the segments.

After the rocking frames have reached the end of their forward movement and the roller 73 has dropped off from the rear end of the concentric portion 69 of the cam 67, the gear segments are moved forwardly by operated mechanism into engagement with their respective dial pinions and are held in this position during the entire subsequent backward movement of the rocking frames, which is effected by operated mechanism. During the backward movement of the rocking frames, the gear segments are raised to their highest positions, while in engagement with the dial pinions by the rod 22 and connecting parts and turn the dials backwardly. At the end of the upward movement of the gear segments the latter are released, so as to permit them to move into their retracted position, out of engagement from the dial pinions.

During this operation, those gear segments which are held or locked in their highest positions, by reason of their dials being at zero, are simply moved forward at the end of the forward movement of the rocking frames, so as to engage with their respective dial pinions and are again moved backwardly out of engagement therefrom at the end of the backward movement of the rocking frames, without disturbing their respective dials. Each of the unlocked gear segments is moved downwardly a number of spaces corresponding to the number which is registered on its dial, the extent of this movement being controlled by the companion trip cam which arrests the forward movement of the key lever, through the medium of its feeling lever, when the proper stop shoulder of the key lever has been presented to the controlling arm.

Upon now moving the gear segments forwardly in their variously depressed positions and then raising them to their highest position, each depressed gear segment will turn its dial backward the same number of spaces that the gear segment was depressed. Inasmuch as each gear segment was permitted to descend by its trip cam, feeling lever and key lever the same number of spaces as the number indicated on its dial, the gear segment subsequently moves upwardly the same number of spaces before reaching its highest position, thereby turning its dial backwardly the same number of spaces and restoring the same to zero. When all of the dials have been returned to zero, the shoulders 56 of all the trip arms engage with the lowest parts of all of the trip cams 57.

The cams 14 and 67 are provided with a longitudinal slit 74, as shown in Figure 33, so as to facilitate the manufacture of these parts.

The mechanism whereby the positions of the cams 14 and 67 are reversed preparatory to restoring the dials to zero is constructed as follows:

The cams 14 and 67 drop into their operative position by gravity. Each of these cams is provided in rear of its pivot with a tail 75 which is depressed when it is desired to lift the respective cam into its inoperative position.

76 is a shifting lever which is pivoted at its lower end and is normally turned so that its upper end is disengaged from the rear side of the tail on the cam 14 by a spring 77, as shown in Figures 2 and 7. 78 (Fig. 10) is a shifting lever which is pivoted between its upper and lower arms and arranged with its upper arm in rear of the tail on the cam 67 and normally held in engagement therewith by a spring 79, as shown in that figure. 80 represents an elbow lever pivoted below the bottom of the keyboard, as represented in Figure 10. 81 represents a main line or cord which is connected with the lower arm of the elbow lever 80 and which is provided at its rear end with two branches 82 and 83. The branch 82 connects with the shifting lever 76 above its pivot, and the branch 83 connects with the shifting lever 78 below its pivot. 84 represents a shifting key having a depending stem which is guided in top and bottom of the key-board and which bears with its lower end against the upper arm of the elbow lever 80. Upon depressing the key 84, the elbow lever 80 is turned, so as to draw the cords or lines 81, 82 and 83 forwardly, thereby moving the upper end of the shifting lever 76 into engagement with the tail of the cam 14 and lifting the same into an inoperative position, while the shifting lever 78 is moved rearwardly with its upper arm from the tail of the cam 67, thereby allowing the latter to drop into its operative position. Upon depressing the gear segments while the parts are in this shifted position, the segments move downwardly out of engagement with the dial pinions. After the gear segments have been depressed they are moved forwardly into engagement with their respective dial pinions by an elbow lever 85 which is connected with its lower arm by a line or cord 86 to the rod or bar 7, as shown in Figure 10, or to one of the rock arms 8. The elbow lever is turned in the proper direction for this purpose by a shifting key 87 having a depending stem which is guided in the top and bottom of the keyboard and which bears against the upper arm of the elbow lever 85. After the gear segments have been moved forwardly into engagement with the dial pinions, while in the depressed position, the gear segments are retained in this position, and at the same time raised until they reach their uppermost position, whereby the dials are turned to zero. The shifting key 87 is now released which permits the spring 11 to move the gear segments rearwardly out of engagement with the dial pinions. The key 84 is also released, thereby permitting the shifting levers 76 and 78 to resume the positions shown in Figures 2 and 10, leaving the machine in position to resume adding.

Each of the dials 2 is held against turning when out of engagement with its actuating gear segment by means of a detent pawl 103 which engages with the front side of the companion gear pinion, as shown in Figures 2, 7 and 14. The pawls 103 of the several gear pinions are mounted on a transverse pawl bar 104, which is supported at its ends by means of two pawl arms 105, which turn loosely upon the supporting rod on bar 35 of the key levers, as shown in Figures 2 and 14. The pawl arms are moved rearwardly for engaging the pawls of the bar 104 with the gear pinions by means of springs 106, as shown in Figures 10 and 14. These springs are connected loosely at their rear ends to the rock-shaft 9 and at their front ends to the pawl arms 105. During the forward movement of the gear segments preparatory to turning the dial pinions, the detent pawls are swung forwardly out of engagement with the dial pinions by means of two shifting rods 107 which are connected at their rear ends to opposite ends of the transverse rod 7 or some part moving therewith and each of which is provided at its front end with a fork or bifurcation 108, which engages with a pin or shoulder 109 on the pawl arm arranged on the adjacent side of the machine, as shown in Figures 2, 10 and 14. As the gear segments move forward into engagement with the gear pinions the shifting rods 107 move the detent pawls 103 out of engagement with the dial pinions and when the gear segments move backwardly the detent pawls are again engaged with the dial pinions by the springs 106.

*Recording mechanism*

For this purpose of recording the numbers which are added together by the above described mechanism a recording mechanism is provided which is constructed as follows:—

140 (Figs. 1, 2, 10, etc.) represents a printing roller or platen which is arranged transversely in the upper, rear part of the machine and under the lower side of which the sheet or other article is placed which receives the record. 141 represents a number of type segments which are arranged transversely side by side below the platen and which are pivoted at their front ends to the supporting bar 31 upon which the rear ends of the controlling arms are pivoted. Each of these type segments is provided at its rear end with a segmental row of type carriers 142, which are capable of moving radially back and forth on the type segment.

Each of the type carriers is provided at its rear end with a type and is guided upon the type segment by means of screws or rivets 143 (Figs. 30 and 31) secured to the type carrier and arranged in radial slots 144 formed in the type segment, as shown in Figures 2, 3 and 31. Each of the type carriers is held in its inward or retracted position by means of an S-shaped spring 145, which is arranged between the carrier and the type segment and is secured with one end to the carrier and with its other end to the type segment, as shown in Figures 30 and 31. Upon raising or lowering the type segment any one of its type can be brought to the printing point or line, and upon striking the back or inner end of the type carrier, when the same is in line with the printing point the type carrier will be driven outwardly and its type will produce an impression on the sheet supported by the platen. After the carrier has received the blow for driving the same against the platen, the carrier is again quickly retracted to its innermost position by means of its spring.

Each of the type segments is connected with one of the controlling arms, so that upon depressing a controlling arm and the registering gear segment connected therewith, the companion type segment will be raised and present one of its type to the printing point.

For convenience in operating the machine, the keys are separated a considerable distance on the key-board and in order to produce a compact record, the printing segments are arranged closer together than the keys and the registering mechanism. In order to permit this arrangement, each type segment and its corresponding controlling arm are connected by a connecting arm 146, as represented in Figures 1, 2 and 39. The connecting arms of the central controlling arms, and type segments are comparatively straight, but the connecting arms of the outer type segments and controlling arms are arranged obliquely, the degree of this obliquity gradually increasing from the central type segments and controlling arms in opposite directions toward the outer type segments and controlling arms, as represented in Figure 1. The connecting arms 146 of the outer controlling arms are arranged in the spaces behind the upright parts and above the horizontal parts of the controlling arms, thereby permitting the inner controlling arms to move up and down without interfering with the connecting arms 146 of the outer controlling arms.

The types on each type segment are arranged to correspond with the teeth and numbers of its companion gear segment and registering dial, the zero type being at the upper end of the series and the progressively higher digits arranged in their order downwardly from the zero type. When the registering gear segment is in its highest position it presents its zero tooth to the dial pinion, and the type segment which at this time is in its lowest position presents its zero type to the printing point. Upon depressing a gear segment so as to present one of its higher teeth to the dial pinion, its companion type segment is raised proportionally and presents a corresponding higher numbered type to the printing point.

147 represents a number of hammers whereby the type carriers are struck for driving the type against the platen. One of these hammers is arranged adjacent to each type segment and is provided with a head which is arranged in front of the series of types and in line with the printing point of the platen. Upon shifting the type segment so as to bring one or another of its type carriers to the printing line and then operating the hammer, the latter delivers a blow against the inner end of the particular carrier which is at the printing point and produces an impression of its type on the platen. The several hammers are pivoted on the transverse rod 12, arranged in rear of the segments; and each of the hammers is yieldingly held in its forward position by a spring 148 connected at its lower end to a cross bar 149 and at its upper end to a depending arm 150 on the hammer.

151 represents a vertically movable trip bar or rod which is arranged transversely below the hammers and whereby the latter are operated. This bar is supported at its ends upon the rear ends of rock arms 152 which turn loosely with their front ends on the rod 31 supporting the type segments and controlling arms.

153 (Figs. 2, 3, 6 and 17) represents a number of hammer or trip pawls, whereby the hammers are retracted preparatory to delivering a blow against the type carriers which are at the printing point. One of these pawls is arranged adjacent to each hammer and pivoted loosely at its lower end to the trip bar 151, and its upper end is provided on its rear side with a downwardly facing hook or shoulder 154, and above said shoulder with a trip face 155, as shown in Figure 17. Each of the hammers is provided in front of its pivot adjacent to the upper end of the hammer pawl with a lower trip lug or shoulder 156 and an upper trip lug or shoulder 157. When the parts are at rest, the hammer pawl 153 is raised into its highest position and the hammer is in its normal position with its lower trip lug 156 below and in rear of the hook of the hammer pawl and with its upper shoulder 157 in rear of the trip face of the hammer pawl, as represented in Figures 2, 3 and 17.

Upon shifting the hammer pawl rearwardly, while the parts are in this position, so that its hook overhangs the lower shoulder 156 of the hammer, and then pulling the hammer pawl downwardly, the hook of the hammer pawl engages with the lower shoulder of the hammer and turns the same so that its head is retracted from the type carrier at the printing line. As the hammer moves downwardly with the hammer pawl, the upper shoulder of the hammer comes into engagement with the trip face of the hammer pawl and during the continued downward movement of the hammer and its pawl, this upper shoulder gradually crowds the hammer pawl forwardly with reference to the hammer by reason of the hammer and its pawl swinging on different centers. During the last portion of the downward movement of the trip bar 151 and the hammer pawl mounted thereon, the pawl is crowded forwardly by the upper shoulder 157 of the hammer to such an extent that its hook is disengaged from the lower shoulder 156 of the hammer, thereby liberating the latter and permitting its spring 148 to throw the same quickly and deliver a blow against the type carrier at the printing line. The trip bar 151 now rises and carries the hammer pawl into its highest position, preparatory to again engaging the hammer for depressing the same.

158 (Fig. 3) represents a number of upright shifting arms whereby the hammer pawls are moved rearwardly, so that their hooks engage with the lower shoulder of the hammers. One of these arms is arranged adjacent to each hammer pawl, as shown in Figures 3, 6 and 17, and is pivoted at its lower end on the trip bar 151, and its upper end is provided with a roller or projection 159 which bears against a hammer cam 160 on the lower part of the adjacent type segment, as shown in Figures 3, 7 and 39. This hammer cam is provided at its upper end with a receding or low portion, an inclined portion arranged below the low portion, and a concentric or high portion arranged below the inclined portion. Each shifting arm 158 is moved forwardly and its roller is yieldingly held in engagement with the adjacent hammer cam by a spring 161 connecting said arm with a cross bar 162 secured to the rock arms 152, as represented in Figure 7. The backward movement of each hammer pawl with reference to its companion shifting arm, is limited by means of a stop 163 secured to the upper portion of the hammer pawl and engaging with the front side of the shifting arm, as represented in Figures 3, 5 and 17.

Each hammer pawl is yieldingly held in its rearmost position with reference to its shifting arm by means of a C-shaped spring 164 secured with its ends, respectively, to the hammer pawl and its shifting arm, as shown in Figures 2, 3 and 17. In the lowermost position of a type segment the receding part of its cam is presented to the roller of the shifting arm 158, which permits the hammer pawl to be retracted into its foremost position, as represented in Figure 2. Upon depressing the trip bar 151 when the parts are in this position, the roller 159 is not engaged soon enough by the incline of the cam 160 to engage the hook of the hammer pawl with the lower shoulder of the hammer, before the hook has passed below this shoulder; but instead, the trip face of the hammer pawl slides idly against the shoulder 156 without retracting the hammer, whereby no impression of the particular type at the printing line is produced. If the type segment is raised, so as to present one of its lower types to the printing point or line, the incline of its cam, during the first part of the upward movement of the segment, moves the shifting arm 158 rearwardly together with the hammer pawl yieldingly connected therewith, so that the hook of the hammer pawl stands over the lower shoulder 156 of the hammer. Upon now depressing the pawl 153 the hammer will be retracted and released near the end of the downward movement of the pawl, and will be quickly swung up by the spring 148 thereby delivering a blow against the type at the printing point and producing an impression thereof.

The incline 160 of the type segment cam is so constructed that it throws the hammer pawl backwardly into an operative position when the segment is raised one digit space, and during the continued upward movement of the segment, the hammer pawl is held in this operative position by the high concentric part of the segment cam. By thus constructing the type segment cam its companion hammer pawl is not shifted when the segment is not raised and its zero type remains at the printing line, but the hammer pawl is shifted into an operative position for producing an impression, if the type segment is raised one or more digit spaces and presents any one of its digits higher than zero to the printing line.

*Automatic printing of zero.*

165 (Figs. 3, 17 and 19) represents a number of transfer or coupling fingers which enable the ciphers in a number to be printed automatically. One of these transfer fingers is secured to each of the shifting arms 158, as represented in Figures 3, 7, and 17, and extends laterally toward the right therefrom into engagement with the shifting arm of the next lower hammer pawl, as represented in Figure 19. If any one of the printing segments remains in its lowest position, so that its cipher remains at the printing line and the next higher printing segment has been raised for printing a higher number or digit, the transfer finger of the higher hammer shifting arm 158 while being moved rearwardly by the cam of its companion printing segment, is caused to engage with the shifting arm 158 of the next lower hammer pawl and shift the latter backwardly, so that its hook is carried backwardly over the lower shoulder of the companion hammer. Upon now depressing the trip bar 151, the higher hammer pawl 153 is coupled with its hammer, and the next lower hammer pawl is also coupled with its hammer, whereby an impression of the cipher or zero type on the lower segment is produced on the platen at the same time that the next higher number is printed on the platen.

If two ciphers occur in succession in the body of a number, the shifting arm to the left of the highest order printing segment to be operated for printing a zero sets the hammer mechanism of said highest zero-printing segment by means of the transfer finger of said shifting arm, and the shifting arm of said highest zero printing segment in turn by means of its transfer finger sets the hammer mechanism of the printing segment of next lower order, etc. This operation of producing an impression of the cipher type is effected automatically and renders it possible to print any number of ciphers in succession in the body of a number because the hammer operating mechanism of each segment which remains standing with its upper type at the printing line is controlled by the hammer operating mechanism of a higher type segment and in turn controls the hammer operating mechanism of the next lower type segment, if the next lower segment presents a cipher to the printing line.

Only the ciphers below the highest digit in the number to be recorded are thus printed automatically because the printing of a digit depends upon the upward movement of a printing segment, thereby avoiding the printing of ciphers ahead of the highest digit in the number to be recorded. The hammer shifting device of the segment which prints the numbers representing units of cents is, preferably, not provided with a transfer finger to operate on the hammer shifting device of the segment which prints fractions of a cent, because it is proper that the space to the right of the lowest integer shall remain blank when no fraction is recorded therein.

The trip bar 151 is raised by one or more springs 166 (Fig. 10) which connects this bar with the transverse rod 12, and the upward movement of the bar 151 is arrested when the hammer operating pawls reach their highest position by a transverse bar 167 (Figs. 2, 3, 10 and 19) which is engaged by the rear ends of the rock arms 152. 168 represents a coupling hook, whereby the hammer trip devices are depressed. This hook is pivoted with its upper end to the trip bar 151 and its lower engaging end is provided with a notch having upper and lower shoulders.

In the lowered position of this hook its notch engages with a cross bar 169 which is connected with the rock arms 24, as represented in Figures 2 and 7, so that the hook and the hammer operating devices connecting therewith are actuated from the rocking frames 15 and 29, through the medium of the rock arms 24. In the rearmost position of the rocking frames, the front ends of their notches 28 bear against the front side of the bar 25 to which the gear segments are yieldingly connected, and the cross bar 169 bears against the rear or upper shoulder of the notch of the hook 168, as represented in Figure 2.

Upon swinging the rocking frames forward, the incline of the cam 14 first raises the rock arm 13 and shifts the gear segments into engagement with the dial pinions, and after the segments have been so shifted, the rear shoulders of the notches 28 in the rocking frames engage with the cross bar 25, so that thereafter this bar is carried downward with the rocking frames and the gear segments are depressed. During this downward movement of the bar 25 with the rocking frames, the companion bar 169 moves down idly in the notch of the hook 168 until this bar engages with the lower or front shoulder of this hook. After the cross bar 169 engages with the lower shoulder of the notch of the hook, the latter and the hammer operating devices connected therewith are moved downward with the rocking frames until these frames reach the end of their downward movement. During the last portion of the downward movement of the rocking frames the hammer pawls are disengaged, as before described, from the retracted hammers, whereby the latter are released and strike the type carriers which are at the printing line. By this means, the blow of the hammers is delivered after the registering of the numbers has been effected on the dials and the type segments have been shifted into their proper position for recording the respective number.

The hammers do not follow the type carriers to the end of their outward movement but are stopped short, after delivering a blow against the inner ends of the carriers by their depending arms 150 engaging with a rubber facing 170 on the cross bar 167, as shown in Figure 3, so that the types are moved outwardly by the impact of the hammers and are then returned by their springs so as to clear the printing surface.

*Non-print mechanism*

When it is desired to only add the numbers and not record the same, the coupling hook 168 is raised with its notch out of engagement with the cross bar 169, which allows the rocking frames and connecting parts to move back and forth without affecting the printer operating devices. The coupling hook is disengaged from the cross bar by means of an elbow lever 171 (Fig. 2) secured to a transverse rock shaft 172. The lower arm of the elbow lever is connected with the shaft 20 by a spring 173, whereby the lever and the shaft carrying the same are turned in the direction for disconnecting the upper arm of the lever 171 from the hook 168, thereby permitting the latter to engage the bar 169.

174 (Fig. 10) represents an elbow lever arranged below the bottom of the key-board and having its lower arm connected by a line or cord 175 to the upper arm of the elbow lever 171. 176 represents a shifting key having a depending stem which is guided in the top and bottom of the keyboard and which engages with its lower end against the upper arm of the elbow lever 174. Upon depressing this key the elbow lever 174 is turned in the direction for moving the rock arm 171 into engagement with the coupling hook 168 and disengaging the latter from the cross bar 169, thereby throwing the recording mechanism out of gear. Upon releasing the key 176, the rock arm 171 is permitted to swing backwardly and allow the coupling hook to engage with the cross bar 169, thereby throwing the recording mechanism into gear. When the gear segments and the printing segments are thus operated relatively to the keys which have been depressed, the number represented by the depressed keys is registered and also recorded by the printing mechanism. The addition of further numbers proceeds in like manner the several numbers added successively by the registering mechanism but each number is printed individually by the recording mechanism.

*Total-printing and clearing*

When it is desired to print or record the total at the foot of the column of the numbers which have been printed, the operation is as follows:—The key 84 (Figs. 1 and 10) is first depressed, thereby raising the cam 14 into an inoperative position and lowering the cam 67 into an operative position. Upon now moving the rocking frames 15 and 29 forwardly the feeling levers 61 are turned so as to move their feeling fingers forwardly into engagement with the respective cams 57 and at the same time each feeling lever carries the adjacent key lever forwardly so that its particular stop shoulder 39 corresponding to the position of the trip cam 57 and its dial is moved into the path of the stop lug 34 of the controlling arm. After the key levers have been thus shifted forwardly into their respective positions corresponding with their dials, the continued forward movement of the rocking frames causes the gear segments while in a retracted position out of engagement with the dial pinions to be depressed until each segment is arrested by the engagement of the stop lug on its controlling arm with the respective stop shoulder of its key lever, whereby each printing segment is raised so as to present the type carrier to the printing point which carries the type corresponding to the number registered on its companion dial. During the last part of the forward and downward rocking movement of the rocking frames the hammers are operated and the particular type at the printing line are impressed on the platen. Upon now swinging the rocking frames backwardly, the gear segments are raised while still in a retracted position out of engagement with their companion dial pinions, thereby permitting further numbers to be added to the total already registered on the dials. If however, it is desired to turn the dials back to zero, after the total of the added numbers has been printed or recorded the gear segments, while in the retracted lower position which they occupy while printing the totals, are moved forwardly into engagement with their respective dial pinions by the depression of the key 87 (Fig. 10). Upon now moving the rocking frames backwardly the gear segments are raised while in their forward position in engagement with their pinions, whereby each of the latter is turned backwardly. When the segments reach the end of their upward movement, the dials have been turned backwardly a number of spaces corresponding to the number on the dial, thereby turning all of the dials to zero.

In the highest registering and recording mechanism which registers and records the highest numbers for which the machine is designed, the stop arm 37 having the differential stops, is not provided with a lower key operated arm 36, because the arm 37 is only used to arrest its gear segment and printing segment at different points, for setting the parts preparatory to turning the highest dial to zero or for printing the total of the number indicated by the highest dial.

*Duplicate printing by counterpart types.*

For the purpose of permitting the numbers to be printed in duplicate, for instance, when it is desired to print an amount on a bank check, and the same amount on a stub, the machine is provided with mechanism which is constructed as follows:

1410 (Figs. 1, 15 and 19) represents a number of duplicate printing or type segments which are arranged transversely in line and preferably toward the right of the main printing segments 141, and which are pivoted loosely at their front ends on the supporting rod 31. One of these duplicate number printing segments is provided for each of the main number printing segments, and each duplicate segment is connected with its companion main segment by a U-shaped frame (Fig. 21) which frame is connected by the upper ends of its arms 189 to its duplicate and main segment and has its cross bar 190 arranged traversely below the intervening segments, as shown in Figures 1, 2, 4, 7 and 21. The cross bars 190 are arranged sufficient distances below the segments so that each pair of connected main and duplicate printing segments can be raised to its highest position without interfering with the other segments. For the purpose of permitting the connecting frames of the several pairs of printing segments to be arranged compactly, the arms of the connecting frame are curved concentrically with the pivots of the segments, as represented in Figures 2 and 4.

Each of these duplicate printing segments is provided with type carriers corresponding to and constructed the same as the type carriers of its companion main segment and each of these duplicate segments is provided with a hammer operating device which is constructed the same as the hammer operating devices of the main segments, and the same description and letters of reference, therefore apply to the details of both the main and duplicate printing segments.

Duplicate printing inoperative

If it is desired to duplicate only the small numbers no duplicate segments need be provided for the higher numbered printing segments. For the purpose of throwing the duplicate printing mechanism out of gear when it is not desired to print the numbers in duplicate a horizontal movable bar 191 (Figs. 4 and 22) is provided which is arranged transversely in rear of the hammer pawls of the duplicate printing segments and which is provided with a number of forwardly projecting lugs or stops 192, as represented in full lines in Figures 4, 19 and 22. Upon shifting this bar so that its stops stand in rear of the duplicate hammer pawls, as shown in full lines in Figure 22, these pawls are prevented from being swung rearwardly and operating the hammers. Upon moving this bar so that its stops clear the duplicate hammer pawls, as represented by dotted lines 192ª, Figure 22, these pawls are free to be swung rearwardly by the segment cams 160 into engagement with the hammers, so as to retract the same during the downward movement of the pawls for producing an impression of the types of the duplicate segments which are at the printing line. A suitable key or finger-piece is provided, by the operation of which the bar 191 is shifted into effective position.

Horizontal ruling

For the purpose of producing horizontal or cross ruling upon the sheet or surface which receives the record, the following mechanism is provided:—

193 (Figs. 2, 7 and 20) represents the lowermost type carrier of each of the number printing segments, each of which is provided at its rear end with a horizontal ruling type. Each of these ruling type carriers is constructed the same as the number type carriers with the exception that the front end of each ruling type carrier is widened horizontally, preferably, in both directions in the form of the letter T, as shown in Figure 20, and the ruling type extends transversely from end to end of the widened part of this carrier, so that the ruling types, when placed transversely in line and driven against the platen, will produce a practically continuous line transversely on the recording surface. Each of the number key levers is provided on the front side of its upper arm with a ruling stop or shoulder 194, which is arranged one space below the lowermost number registering stop or shoulder 39. Upon swinging the key levers, so as to bring their ruling shoulders 194 into the path of the lugs 34 of the controlling arms, the latter together with the gear segments connected therewith are depressed upon moving the rocking frames 15 and 29 forwardly, until the stop lugs 34 of the controlling arms engage with the lowermost or ruling shoulders 194 of the key levers. When the controlling arms reach this lowermost position, the printing segments connected therewith have been raised to their highest position and present the ruling types of all of the segments to the printing line. During the last portion of the forward movement of the rocking frames 15 and 29, while the ruling types are at the printing line, the proper hammers are operated for producing an impression of these types.

The key levers are turned simultaneously for bringing all of their ruling shoulders simultaneously into the path of the stop lugs of the respective controlling arms by means of a rocking plate 195 which is arranged transversely in front of the lower arms of the key levers and overhangs the front ends thereof, as represented in Figures 2, 7 and 26. This rocking plate is secured to a transverse rock shaft 196 which is journaled in the frame of the machine and which is turned for holding the rocking plate in its uppermost position out of engagement with the key levers by means of a spring 197 as shown in Figure 26.

198 (Fig. 10) represents a shifting key whereby the parts are shifted to permit of producing cross or horizontal ruling. This key is provided with a depending stem which is guided in the top and bottom of the keyboard and which engages against the rear end of a rock arm 199 projecting rearwardly from the rock shaft 196, as represented in Figure 26. Upon depressing this key, the rocking plate 195 is turned in the direction for depressing the front arms of all the number key levers and bringing the ruling shoulders 194 on the upper arms thereof into position for arresting the type segments during their upward movement when the ruling types arrive at the printing point.

In order to prevent the gear segments from meshing with the dial pinions during the cross ruling operation the position of the cams 14 and 67 is reversed at the same time that the plate 195 is depressed. This is effected by a depending arm 1960 secured to the shaft 196 and connected by a cord or wire 1961 with the branch wires 82, 83 leading to the shifting levers 76 and 78, as represented in Figures 10 and 26. When it is desired to produce horizontal ruling on the recording surface, the key 198 is depressed thereby raising the cam 14 into an inoperative position, depressing the cam 67 into an operative position and moving all the number key levers with their ruling shoulders 194 into the paths of the stop lugs of the controlling arms. Upon now moving the handle 21 (Fig. 15) forwardly, the rocking of the frames 15 and 29 first causes the gear segments together with their controlling arms to be moved downwardly until arrested by the ruling shoulders of the keys, in which position of the parts, the printing segments have been raised with their ruling types to the printing line. The continued forward movement of the rocking frames operates the hammer tripping mechanism and produces an impression of the ruling types on the recording surface. Upon now moving the handle 21 backwardly and releasing the key 198, the parts resume their normal position. While the cams 14 and 67 are reversed so as to move the gear segments downwardly out of engagement with the dial pinions for producing horizontal ruling, the feeling levers are also shifted, but this movement of the feeling levers is of no effect.

Vertical ruling

Mechanism is provided whereby vertical ruling may be produced on the recording surface, this mechanism being constructed as follows:—

203 (Figs. 1, 9, 15 and 19) represents an upright ruling lever which turns loosely on the supporting bar 12 and which is arranged between the dollars and dimes printing segments. The upper arm of the ruling lever is provided with a vertical ruling blade 204 (Fig. 9) which is arranged close to the platen when in its upper position. The ruling lever is yieldingly held in this position by means of a spring 205 connected with the lower arm of the ruling lever and the movement of the latter toward the platen is limited by the engagement of its lower arm with the rear side of a rubber buffer 206 on the cross bar 167 similar to the rubber 170. 207 represents a pawl whereby the ruling lever is retracted and then released for permitting the same to deliver a blow against the recording surface for producing a vertical ruling impression thereon. This pawl is pivotal at its lower end on the cross bar 151 and is yieldingly held with the hook 208 on its upper arm in engagement with a shoulder 209 on the ruling lever by means of a spring 210 which connects the lower arm of the ruling lever with the rod 162.

In the uppermost position of the bar 151 the ruling pawl engages the shoulder of the ruling lever and upon depressing this bar, the ruling lever is pulled downward by the ruling pawl. During this downward movement of the ruling lever and pawl, the front side of this lever engages with the upper arm of the pawl and gradually crowds the pawl forward until the pawl is disengaged from the shoulder of the lever. When the ruling lever is thus released from the pawl, the lever is quickly turned by the spring 205 in a direction for throwing its upper arm upwardly, whereby its blade delivers a blow against the recording sheet or surface on the platen and produces a ruling impression thereon. During the last portion of the subsequent upward movement of the ruling pawl 207 its hook again engages over the shoulder of the ruling lever. This construction of vertical ruling devices produces the vertical ruling in sections by successive blows of the ruling blade.

Indicator or detector dials

In order to enable the operator to see which particular character or characters the machine is set for printing after depressing the keys, and thereby detect any errors in the depression of the keys, each of the key levers is provided with an auxiliary dial, indicator, or detector 238 which is turned forward the same number of spaces that the key lever has been depressed and then returns to its initial position when the key lever moves backward into its normal position. In the preferred construction of the detector dials shown in Figures 1, 2, 7 and 14, each of these dials consists preferably of a wheel 238 provided on one side with a pinion 239 which is engaged by a gear segment 240 secured to the adjacent key lever, as shown in Figures 2, 7 and 14.

Upon depressing one of the number registering and recording keys, the detector dial thereof is turned forwardly by the connecting gearing the same number of spaces corresponding with the number of the key which has been depressed. If a key lever is not depressed its detector dial remains at zero.

The detector dials of the several registering and recording devices are mounted loosely on a transverse supporting rod 241.

Platen mechanism

The mechanism whereby the platen is supported and operated and the record sheet or other impression surface which receives the record is presented to the printing line, is constructed as follows:—

The frame of the carriage which supports the platen, paper and inking device consists of a transverse supporting sleeve 260 (Figs. 2, 10, 13 and 16) arranged in rear of the type-controlling mechanism and provided at opposite ends with two upwardly and forwardly projecting arms 261 and with two upwardly and rearwardly projecting arms 262. The supporting sleeve is arranged to slide transversely on a rod or track 262 which is secured with its ends to the sides of the main frame 1.

The platen is journaled in the upper ends of the front arms 261 of the paper carriage and is held in position at the printing line by means of a catch 264, Figure 13, which engages with its front hooked end over a transverse rod 265 arranged below the platen and secured with its ends to the sides of the main frame, as represented in Figures 1, 2, 13 and 19. This catch is yieldingly connected with the paper carriage, so as to permit the platen to recede more or less from the printing types, for the purpose of adjusting the platen according to the thickness of the sheet or sheets of paper or other object which receives the impression and which is interposed between the platen and the printing types.

As shown in Figure 13, this yielding connection between the paper carriage and its retaining catch consists of a flat tension spring 266 which is secured with its lower end to the right-hand front arm 261 of the paper-carriage, and the retaining catch 264 is pivoted to the upper end of this spring so as to turn in a vertical plane. The upper end of the tension spring 266 is provided with a thumb piece 267, and the adjacent end of the retaining catch is provided with a similar thumb or finger piece 268. The paper carriage is swung forward until its front arms 261 strike the cross bar 265. The retaining catch, while moving forward with the carriage, rides with its inclined front end over the rod 265 and then engages with the front side of this bar, thereby holding the paper carriage in its operative position.

If the article which receives the record is above normal thickness, the platen cannot be moved forwardly sufficiently to engage the upper arms 261 with the cross bar 265. In order to hold the carriage in position while printing upon such an abnormally thick object, the upper end of the spring 266 is pressed forward by means of its finger piece 267 until the hook of the retaining catch engages with the cross bar 265. When it is desired to inspect the writing on the record sheet or object, the upper end of the paper-carriage may be swung backwardly from the printing mechanism by first pressing the tension spring 266 forwardly, to ease the strain on the catch 264, and then turning this catch by means of its finger piece out of engagement with the cross bar 265, thereby leaving the carriage free to move rearwardly. The catch 264 is yieldingly held in engagement with the cross bar 265 by a spring 269 which is secured at one end to the main tension spring 266 and bears with its opposite end against the rear end of the catch.

When printing upon a sheet of paper, this sheet is fed forwardly underneath the platen and upwardly in front of the same, so that the sheet passes the printing line. The sheet is pressed against the under side of the platen, in rear of the printing line, by a transverse presser roller 270 (Figs. 2 and 10) arranged below the platen and journaled with its ends in the front arms 261 of the paper-carriage.

When it is desired to print upon a roll or web of paper, this roll is supported in rear of the platen and fed with its web around the platen in the same manner in which a sheet is fed. As shown in Figures 2, 10 and 13, an upper roll of paper is supported upon a divided spool consisting of two sections 271 which support opposite ends of the roll. 272 represents a horizontal supporting spindle which extends through the center of the upper roll of paper and through the sections of its supporting spool and which is supported at its ends in openings formed in the rear arms 262 of the paper carriage. This spindle is held against displacement in the paper carriage by a catch 273 pivoted to one of said arms 262 and engaging with a notch or groove 274 formed in said spindle, as represented in Figures 11 and 12. The paper roll may be held against longitudinal displacement on the spindle by any suitable means, for instance by engaging one of its spool sections against one of the rear carriage arms and securing a clamping collar 275 to the spindle and bearing against the outer side of the other spool section, as represented in Figure 11. By moving the sections of the roll-supporting spool toward and from each other on the spindle the spool can be adjusted to suit different widths of paper.

When it is desired to print the record in duplicate, a duplicate roll or web of paper is fed simultaneously with the main sheet or web past the printing line. The duplicate roll or web of paper is preferably supported below the main roll on the sections 276 of a divided spool which is mounted on a spindle 277. This roll spindle is supported at its ends by means of hangers or hooks 278 which engage with the ends of the rear arms of the carriage, as shown in Figures 10, 11, and 13. The lower spool is held on the spindle by a collar 279 and the lower spindle is held in place on the hangers by a catch 280.

*Paper guides*

281 (Figs. 1, 2, 10 and 13) represents two paper guides which engage against opposite sides of the webs or sheets between the rolls and the platen, and prevent lateral displacement of the same. Each of these guides is adjustably secured to the adjacent front arms of the paper-carriage, preferably by means of a clamping screw 282 arranged on the adjacent carriage arm and engaging with a slot in the adjacent guide.

*Platen feed or line spacing*

283 (Figs. 10, 15 and 19) represents a platen feed lever which is pivoted loosely on the left end of the platen shaft and which is provided on its rearwardly projecting arm with a pawl 284 which engages with a ratchet wheel 285 secured to the adjacent end of the platen, as represented in Figures 1 and 10. 286 represents an intermediate actuating lever which is pivoted on the lower part of the front carriage-arm 261 which is adjacent to the ratchet wheel 285. The ratchet lever is connected with the intermediate lever by means of a link 287 which is pivoted at its upper end to the rear arm of the ratchet lever and is provided at its lower end with a loop 288 which receives the rear arm of the intermediate lever. 289 represents a spring which connects the front arms of the ratchet lever and intermediate lever. The upper end of this spring is connected with the front arm of the ratchet lever a greater distance from the pivot of the latter than the distance beween the connection of this spring with the intermediate lever and the pivot of the latter. By this connection of the spring 289, the leverage of the ratchet lever is greater than that of the intermediate lever, which causes this spring, when both of these levers are free, to turn these levers simultaneously in the direction for raising their rear arms, thereby moving the ratchet pawl upward for taking up a new tooth on the ratchet wheel.

The ratchet pawl is yieldingly held in engagement with the ratchet teeth by means of a spring 290. The movement of the intermediate lever in the direction for raising its rear arm and moving the ratchet pawl backwardly is limited by means of a nose 291 formed on this lever and engaging with a stop on the adjacent arm of the carriage, as represented in Figure 10.

The rocking motion of the intermediate lever is always the same, and in order to enable the same to turn the platen different distances, the rear arm of the intermediate lever is provided on its under side with a number of notches 292 which are arranged different distances from its fulcrum, and one or another of which is engaged by the lower end of the loop 288 on the connecting link 287. Upon engaging this loop with the notch of the intermediate lever nearest its axis, the ratchet pawl is shifted so that the platen is turned one line-space at a time; while upon shifting this loop into engagement with one of the outer notches of the intermediate lever, the platen will be turned forward by its ratchet mechanism a correspondingly greater distance by the operation of the machine.

The intermediate lever is turned in the direction for shifting the platen by a transverse bar 293 arranged below the front arm thereof, as represented in Figures 1, 2, 7, 10 and 19. This bar is supported upon the upper ends of two rock arms 294 which are mounted loosely at their lower ends on the cross bar 167. 295 (Fig. 10) represents a depending arm which is preferably formed in one piece with that one of the arms 294 arranged on the left hand side of the machine. This depending arm is provided with a nose which is arranged in rear of and in the path of the rocking frame 29.

During the last portion of the rearward movement of this rocking frame, it engages with the nose of the depending arm 295 and moves the same rearwardly, and the upper arms 249 connected therewith are moved forwardly, thereby causing the cross bar 293 to be carried upwardly and turn the intermediate lever in the direction for feeding the platen and paper forwardly. During the forward movement of the rocking frame 29, the rock arms 294 are turned backwardly, together with the intermediate lever and connecting parts, by the spring 289 (Fig. 1) preparatory to feeding the platen forward the next line space. As the line spacing of the record sheet by feeding the platen occurs after each item is printed and in the same operation in which said item is printed, the printed record is fed up into visible position at each operation of the machine.

If desired, the platen may be turned by hand when it is desired to adjust the paper, this being effected by releasing the pawl 284 from the ratchet wheel and then turning the platen by means of a button 296 secured to one end of the shaft, as shown in Figures 1, 15 and 19.

The cross bar 293 extends a sufficient distance transversely of the machine so as to engage with the front arm of the intermediate rock lever 286 in all the positions to which the paper carriage can be shifted transversely in the machine.

*Non-print renders paper feed inoperative*

In order to render the paper-feeding mechanism inoperative during the time that the type-controlling mechanism is out of gear, the operating mechanism of the paper feeding mechanism is so connected that the type-controlling and paper-feeding mechanisms are thrown into and out of gear simultaneously.

A simple means for this purpose consists of a link 297 (Figs. 10 and 19) connected at its front end with a depending arm 298 on the rock shaft 172 and provided at its rear end with a slot 299 which receives a pin 300 on the depending arm 295. Upon turning the rock shaft 172, by means of the key 176, in the direction for engaging its upper arm 171 with the hook 168 (Fig. 2) and disengaging the latter from the bar 169, the link 297 is moved rearwardly so that the front end of its slot engages with the pin of the depending arm 295 and holds the latter in its rearmost position. While the depending rock arm is so held it cannot move forwardly with the rocking frame 29 and consequently the ratchet pawl of the paper feed mechanism does not move backwardly for taking up a new tooth on the ratchet wheel.

Upon releasing the key 176 the rock shaft 172 turns in the direction for coupling the type-controlling mechanism with the rocking segments, the link 297 is moved forwardly, and the front end of its slot is carried forwardly a sufficient distance to permit the rock arm 295 to oscillate freely for actuating the paper-feeding mechanism.

Horizontally movable carriage

The paper-carriage is capable of sliding lengthwise on the rods 263 and 265 for presenting different parts of the paper to any particular type and is held in its adjusted position by a spacing device which consists of a graduated adjusting sleeve 301 and an adjusting catch 302, as represented in Figures 2 and 16. The adjusting sleeve is revolubly mounted on the supporting sleeve 260 between the carriage frame arms 261 and is provided with two or more longitudinal series of stop notches or graduations 303, 304. The notches in each series may be equidistant and the notches in one series are spaced different from the notches in the other series, as shown in Figure 16. The catch 302 is pivoted on rod 167 and is yieldingly held in engagement with any one of the notches in the adjusting sleeve 301 by a spring 305. When it is desired to shift the carriage intermittently short distances lengthwise of the platen for printing narrow columns, the adjusting sleeve is turned so as to present its closely spaced notches to the catch, and the latter is shifted from one of these notches to another as the printing progresses. When wider columns are to be printed the adjusting sleeve is turned so as to present correspondingly wider spaced notches to the catch. As shown in the drawings, only two series of adjusting notches are provided on the adjusting sleeve, but more series of notches may be provided if necessary.

If desired, sheet paper may be substituted for web paper, to receive the record, without changing the parts of the machine but the devices for holding the rolls of web paper may be removed from the machine when printing upon sheet paper.

Inking means 306, 307 (Figs. 1, 2, and 10) represent two inking ribbons whereby the impression of the types at the printing line is produced simultaneously on the two sheets or webs of paper. The front or outer ribbon 306 is arranged in front of the outer or lower sheet and the rear or inner ribbon 307 is arranged between the front and rear sheets at the printing line, as represented in Figures 1, 2, 10 and 15. Each of these ink ribbons is wound with its opposite ends upon spools 308 and upon turning one of these spools in one direction, the ribbon will be wound thereon and unwound from the other spool and vice versa. The two spools on the same side of the machine are preferably arranged side by side and are journaled in bearings on the adjacent portion of the main frame, so that the spools of the front ribbon 306 are arranged adjacent to the inner sides of the spools of the rear or inner ribbon 307.

Each of the ink ribbon spools is provided on the front end of its shaft with a ratchet wheel 309, the ratchet wheels of the outer spools being arranged slightly forward of the ratchet wheels of the inner spools. 310 represents two ratchet levers whereby the ink ribbons are intermittently shifted lengthwise of the platen or transversely of the sheet. One of these levers is provided for each pair of spools and is provided at opposite ends with upwardly projecting hooks 311 which are adapted to engage with the ratchet wheels of its respective spools. 312 represents a transversely reciprocating bar which is guided with its ends in the side portions of the main frame and which supports and operates the ribbon-operating ratchet levers. The ribbon ratchet levers are arranged on opposite sides of the reciprocating bar 312 and the latter is provided on its central portion with a pin 313 which engages at its front end with a slot 314 in the central portion of the front ratchet lever, and engages at its rear end with a similar slot 314 in the central portion of the rear ratchet lever as represented in Figures 1, 2, 15 and 24.

Each of the slots 314 consists of two branches which are united at their lower ends and diverge upwardly in the form of the letter V. 315 represents springs whereby the ribbon-shifting ratchet levers are yieldingly held in their operative position. Each of these springs is secured at its upper end to one of the shifting levers adjacent to the junction of its slot branches and with its other end to the adjacent part of the reciprocating bar. The tension of each of the springs 315 serves to draw the central part of its ribbon-shifting lever downwardly so that the upper end of one of its slot branches engages with the pivot pin 313 of the same.

As shown in Figures 1, 15 and 24, the left-hand branch of the V-shaped slot of the front ribbon-shifting lever engages with its upper end against the pivot pin 313, and the connection between the spring 315 and this lever is now arranged on the right-hand side of the pivot pin, which causes the right arm of this lever to be swung downwardly with its hook out of engagement with the opposing ratchet wheel, while its left arm is raised and its hook is yieldingly held in engagement with the adjacent ribbon ratchet wheel.

Upon reciprocating the bar 312, by the spring 316, lever 317 and connecting mechanism hereinafter described, when the parts are in this position, the left arm of the front ribbon-shifting lever is moved idly toward the left and its hook takes up a new tooth on the adjacent ratchet wheel and during the subsequent movement of the lever with the bar 312, toward the right, this hook turns the ratchet wheel and the spool connected therewith in the direction for winding the ribbon thereon. This operation of the front shifting lever is repeated during every reciprocating movement of the bar 312 thereby feeding the ribbon intermittently from the right hand spool to the left hand spool.

When the front ribbon has been wholly unwound from the right hand spool, the further movement of the ribbon toward the left is prevented by reason of the ribbon being connected with this spool. Upon moving the bar 312 toward the right while the right-hand end of the ribbon is thus held, the ribbon-shifting lever is prevented from moving toward the right with the bar, by reason of the hook of its left arm being in engagement with the ratchet wheel of the left-hand ribbon spool. When the ribbon shifting lever is thus arrested, the bar 312 moves toward the right independent of the lever and during this movement, the pivot pin 313 moves to the inner end of the left branch of the V slot and then outwardly in the right branch to the outer end thereof. By thus shifting the pivot pin 313 of the bar in the slot of the lever the connection between this lever and the spring 315 is carried toward the left side of the pivot pin, so that the relative position of the shifting lever and spring is reversed, as represented by dotted lines 310ª, 315ª, in Figure 24.

When this lever is so reversed, its right arm is turned with its hook into engagement with the ratchet wheel of the adjacent ribbon spool, and the left arm thereof is moved with its hook out of engagement with the ratchet wheel of the adjacent ribbon spool, whereby the movement of the ribbon is automatically reversed and the ribbon is caused to wind upon the right-hand spool and to unwind from the left-hand spool. The ribbon continues to move toward the right until wholly unwound from the left-hand spool to which it is connected, when the pivot pin 313 of the ribbon-shifting lever is shifted back to the upper end of the left branch of the V slot, and the movement of the ribbon is again reversed in the same manner as before described.

The front and rear ribbon-shifting ratchet levers are reversed independently of each other and can feed their respective ribbons in opposite directions although they are both operated from the reciprocating bar. The latter is moved lengthwise in one direction, preferably toward the right, by a spring 316, as shown in Figures 1 and 15. The ribbon-shifting bar 312 is moved in the opposite direction by an elbow lever 317 which engages with its upper end against a lug or shoulder on the bar. 318 represents a rock arm which is secured to the rock lever 294, 295 of the paper-feed mechanism and which engages with the lower arm of the elbow lever 317, as shown in Figures 1, 10 and 15. When the rock lever 294, 295 turns in the direction for feeding the paper forward, the arm 318 turns the elbow lever 317 and moves the ribbon shifting bar 312 toward the left, and when the rock lever 294, 295 turns in the opposite direction, the spring 316 moves the bar 312 toward the right. When it is desired to print only one sheet or web of paper one of the ink ribbons may be removed, though not necessarily, as a single impression of the types may be made through both ribbons.

*Full stroke mechanism*

In order to prevent the operator from making only a partial forward and backward stroke of the rocking frames 15 and 29, and thereby prevent erroneous registration, the following mechanism is provided:—

319 (Figs. 2 and 10) represents two detent pawls which are arranged over the rocking frames 15 and 29, respectively, and pivoted on a transverse rod 320, as represented in Figures 2, 7, 10 and 15. Each of these pawls is provided on its underside with two downwardly diverging detents 321 which are arranged substantially at right angles to each other and on its upper side with a V-shaped ridge 322. Upon turning the detent pawl in one direction, its front detent engages with the upper concentric edge or face of the adjacent rocking frame, while upon turning the pawl in the opposite direction, its rear detent engages with said edge. Each of the detent pawls is yieldingly held with either of its detents in engagement with the respective rocking frame by a presser arm 323 pivoted loosely on the transverse shaft 9 and provided at its rear end with a roller or projection which is held in engagement with the ridge of the adjacent pawl by a spring 324 connected with the arm 323 and bearing against the under side of the rod 320 (Figures 2 and 7).

The concentric face or edge of each rocking frame is provided with a segmental series of notches 325 and undercut inclines 326 converging upwardly from the outer sides of the front and rear notches in the said concentric edge, as represented in Figures 2, 7 and 10. In the rearmost positions of the rocking frames 15 and 29, the front detents of the detent pawls engage with the front inclines 326 of the rocking frames and turn the pawls so that their front detents are depressed into engagement with the foremost notches of the frames, while their rear detents are raised, as shown in Figure 2. The pawls are yieldingly held in this position during the forward movement of the frames by the presser arms 323 bearing against the inclined rear sides of the ridges on the pawls.

As the rocking frames move forward the front detents of the detent pawls engage with one pair of notches after another of the frames 15, 29, and at the end of the forward movement of the frames the rear inclines 326 thereof engage with the rear detents of the pawls and turn the same so that the front detents are raised and the rear detents are depressed into engagement with the rearmost notches 325 of the rocking frames. When the pawls are thus reversed by the rear inclines of the rocking frames, the ridge of each pawl is moved with its highest part in rear of the roller of the presser arm, which causes this arm to now hold the pawl in this position during the subsequent backward movement of its frame.

As the rocking frames move backwardly, the rear detents of the detent pawls engage successively with the notches of the rocking frames and when the latter reach the end of their backward movement, the front inclines 326 thereof engage with the front detents of the detent pawls and depress the same into engagement with the foremost notches of the frames and lift their rear detents into an inoperative position, as shown in Figure 1.

If the operator has moved the rocking frames forwardly more or less, so that one of the intermediate notches in each frame stands in front of its detent pawl and then attempts to move the rocking frames backwardly, before completing the forward movement of the frames, the front jaws of the pawls will engage with the intermediate notches immediately in front of the detent pawls and hold the frames against backward movement. After the rocking frames have completed their forward movement and the pawls have been reversed, each rocking frame is in like manner held against forward movement after the same has been moved backward sufficiently to carry one of its intermediate notches in rear of the rear jaw of its detent pawl. By this means the operator is compelled to complete a stroke of the rocking frames in one direction before reversing the movement of the frames, thereby avoiding displacement of the registering and recording mechanism.

*Keyboard mechanism*

The keys which have been depressed in the operation of adding or recording a number are automatically locked in a depressed position until the adding or recording operation has been completed, and then the depressed keys are automatically released and permitted to be raised by their springs.

As shown in Figures 2, 7, 10, 25, 26, 27, 36, 37 and 38, the keys are held in a depressed position by a number of locking plates 327, one of which is arranged lengthwise on the left side of the stems of each row of keys. Each of the locking plates is pivoted at its lower end to the top of the keyboard bottom, so as to swing transversely and is provided along its upper edge with a number of downwardly facing catches or shoulders 328 which are adapted to engage with upwardly facing locking shoulders 329 (Fig. 25) on the stems of the keys. Each of the keys is provided with a convex face below its locking shoulder, consisting of a lower rising portion 330 which inclines upwardly and laterally from the lower part of the key toward the adjacent locking plate, and an upper receding portion 331 which inclines from the upper end of the rising portion to the outer end of the locking shoulder 329 of the stem, as shown in Figures 26 and 38. Each locking plate is drawn yieldingly with its catches against the stems of the adjacent rows of keys by a spring 332, as shown in Figures 26 and 37. The locking catches of the locking plates bear against the key stems below the convex faces thereof when the keys are in an elevated position, as shown in Figure 25.

Upon depressing a key, the convex face on its stem deflects the locking plate and when the key has been depressed fully the respective locking catch of the locking plate engages with the locking shoulder 329 of the stem of the depressed key, thereby retaining the parts which are operated by this key in a shifted position.

If a wrong key has been depressed and the operator subsequently depresses the right key the latter during the first part of its downward movement engages the lower or rising part 330 of its convex face with the adjacent locking catch of the locking plate and disengages the respective locking catch from the locking shoulder of the previously depressed key, thereby releasing the same, as represented in Figures 36 and 38. Upon continuing the depression of the second or correct key after the first or wrong key has been released, the receding or upper part 331 of the convex face of the correct key engages with the adjacent locking catch of the locking plate, thereby permitting the latter to approach the key stem and when the correct key has been fully depressed its locking shoulder is carried below the locking catch of the plate and is engaged thereby, whereby the correct key is locked in a depressed position, as represented in Figure 27. By this means any incorrectly depressed key is automatically released by the depression of the correct key and the latter is in turn automatically locked in a depressed position.

Automatic key release 333 (Fig. 25) represents a transversely movable releasing bar, whereby the keys of the number-registering devices are released. This bar is arranged transversely in rear of the rear ends of the locking plates of the main number keys and is guided with its ends in the frame of the machine, as shown in Figure 25. This bar is provided with a number of upwardly projecting releasing lugs or shoulders 334, one of which is adapted to engage with the right side of a pin or projection 335 on the rear end of each locking plate 327 of the registering keys, as represented in Figures 7 and 25. Upon shifting the releasing bar 333 toward the left its releasing lugs move the main locking plates in the same direction thereby releasing any number keys which are held in a depressed position by the same. The main releasing bar 333 when free is shifted toward the right into its retracted position by the resilience of the springs which hold the main locking plates in their operative position.

The releasing bar 333 is shifted into its operative position by a releasing elbow lever 336 (Fig. 25) which turns on a pivot pin 337 and is connected by its upwardly projecting arm with the releasing bar 333 while its lower arm projects horizontally outward. 358 (Figs. 10 and 25) represents a releasing arm which is arranged lengthwise in the machine and transversely over the lower arm of the releasing elbow lever 336 and which is pivoted at its front end on a pin 339. 340 represents a longitudinal releasing lever connected by an upright cord 341 with the rear end of the releasing arm 338 and projecting with its rear end into the path of the cross bar 25, as represented in Figure 10.

The number keys are held in their depressed position until the rocking frames 15 and 29 have been moved forwardly sufficiently to operate the registering and recording mechanisms in accordance with the numbers of the depressed main keys and then the cross bar 25, during the last part of its forward movement with the rocking frames 15 and 29, engages with the releasing lever 340 and depresses the same. The releasing arm 338, during its downward movement with the releasing lever 340, engages with the lower arm of the elbow lever 336 and turns the latter so that its upper arm moves the releasing bar 333 toward the left and moves the locking plates out of engagement with the number keys, thereby releasing the depressed keys and permitting them to rise preparatory to setting the machine for registering and recording the next number.

The several shifting keys of the machine are arranged in a longitudinal row or column on the left-hand side of the machine, and the elbow levers operated thereby are arranged one behind the other, as represented in Figures 10 and 25.

The column or row of shifting keys is provided with a locking mechanism similar to that of the number keys, but the locking plate of these keys is disengaged from the keystems by a separate releasing mechanism so as to permit the number keys to be released without releasing the shifting keys.

As shown in Figure 25, the release of the shifting keys is effected by a supplemental releasing bar 348 having a lug 349 which engages with the pin 335 on the rear end of the locking plate of the shifting keys and which is guided at its outer end in the main frame. The inner end of the supplemental releasing bar is pivoted to the upper arm of a releasing elbow lever 350. This lever is pivoted on the pin 337 and its lower arm projects toward the right and underneath the releasing arm 338 adjacent to the rear side of the lower arm of the releasing elbow lever 336.

When both lower arms of the releasing elbow levers 336 and 350 are arranged underneath the releasing arm 338, the depression of the latter by the rocking frames causes the supplemental releasing bar to be moved toward the left so that its lug disengages the locking plate of the shifting keys from their stems at the same time that the number key release bar disengages the locking plates of the number keys from their stems, thereby releasing all of the keys simultaneously after the registering and recording of the words and members has been effected.

Repeat key

For the purpose of permitting the numbers represented by the depressed keys to be added and recorded repeatedly, the releasing elbow levers 336, 350 are shifted toward the right and their lower arms are moved from underneath the releasing arm 338 so that the depression of the lever 340 by the rocking frames will not affect the releasing elbow levers 336, 350, thereby retaining the keys in their shifted position and permitting of producing repeated additions and impressions of the types which correspond to the depressed keys. The releasing elbow levers 336, 350 are moved into operative and inoperative position by means of a supporting elbow lever 351, as shown in Figures 10 and 25. This lever is pivoted on a stationary bracket 352 and its upper arm carries the pin 337 on which the releasing elbow levers 336, 350 are pivoted. 353 represents an actuating rock lever which engages with its rear arm against the underside of the lower arm of the supporting elbow lever 351.

354 (Fig. 10) represents a repeating shifting key having a depending stem which is guided in the top and bottom of the keyboard and which engages with its lower end against the front arm of the actuating rock lever 353. Upon depressing the repeating key, the supporting elbow lever 351 is turned by the actuating lever in the direction for moving the releasing elbow levers 336 and 350, so that their lower arms clear the releasing arm 338 and will not be affected by the depression of the latter.

Upon releasing the repeating key the supporting elbow lever 353 is returned to its normal position by a spring 355, shown in Figures 10 and 25, and the releasing elbow levers 336, 350 are shifted into an operative position with their lower arms projecting underneath the releasing arm 338. The releasing elbow lever 350 is turned in the direction for moving the supplemental releasing bar 348 into its retracted position by a spring 356 which is secured to the supporting elbow lever 351. The movement of the elbow lever 350 in this direction is limited by a stop 357 on the supporting elbow lever 351, as shown in Figure 25.

When it is desired to record the total of the numbers added or when it is desired to return the dials to zero, the number keys must all be released in order to permit the key levers to assume a position corresponding to the dials preparatory to recording the total registered by the same. This is effected by an intermediate elbow lever 358 which is pivoted on the pin 339 and which projects rearwardly over the lower arm of the releasing elbow lever 336 but does not project over the lower arm of the releasing elbow lever 350, as shown in Figure 25. 359 (Figs. 10 and 25) represents a longitudinal connecting bar connected at its rear end to the lower arm of the intermediate elbow lever 358 and provided with longitudinal slots 360 which receive pins or projections 361 on the lower arms of the elbow levers 80 and 85 and which are operated by keys 84 and 87, as represented in Figure 10. The pins 361 of the total and zero elbow levers engage normally with the front ends of their respective slots in the connecting bar 359 which causes the latter to be shifted forward by any one of the respective keys without disturbing the other. Upon moving the connecting bar 359 forward by the depression of either key 84 or 87, the intermediate elbow lever 358 is turned in the direction for depressing its upper arm into engagement with the lower arm of the releasing elbow lever 336, thereby releasing all of the number keys. The depressed shifting keys remain depressed until the rocking frames 15 and 29 complete their forward movement and the registering and recording of the total has been effected. The locking mechanism of the shifting keys is so constructed that the key 87 cannot be held down by the adjacent locking plate, as shown in Figure 10, because the depression of the same is necessary only during the backward movement of the rocking frames.

Special key-lock

For the purpose of locking the non-printing key 176 or repeating key 354 in a depressed position when it is desired to continue the use of these keys and the mechanism controlled thereby for some time, each of these keys is provided with a movable locking block 362. Each of these blocks is arranged below the top of the key-board, adjacent to its respective shifting key, and is provided with a thumb piece 363 which is guided in a slot 364 in the top of the key-board and projects above the same. Upon retracting the locking block from above the stop shoulder of the shifting key, as shown in Figure 26, the key can rise to its uppermost position. Upon depressing this key and then shifting the locking block so that it is arranged between the stop shoulder 44 of the key and the top of the key-board, as shown in Figure 27, the key is held in a depressed position.

Key interlocking mechanism

In order to produce a correct register and record of the numbers, each column of number keys is provided with a locking mechanism which prevents more than one key in each of these columns from being held in a depressed position at the same time. This locking mechanism is best shown in Figures 25, 26, 35, and 36 and is constructed as follows:—

365 represents a number of tumblers or blocks arranged in longitudinal rows on the bottom of the key-board, each row being adjacent to the right-hand side of the stems of a respective row of number keys. These tumblers are capable of a longitudinal movement with reference to the column of keys and each set of tumblers is guided on a rod 366 which is supported on the key-board bottom. Each of the tumblers is provided with a convex upper side which preferably slopes or inclines from its highest central part toward the front and rear sides of the tumbler in the form of an inverted letter V. The longitudinal movement of the tumblers is limited by front and rear stops 367, 368 which are engaged by the front and rear tumblers and which also serve to support the guide rod 366 above the bottom 42, as shown in Figure 35. The stem of each number key is provided on the side opposite to its locking plate 327 with a follower or spreading head 369. The heads of the intermediate keys have a convex underside which preferably inclines from its lowest central part to the front and rear sides of the head in the form of the letter V.

Each of the spreading heads, except the foremost and rearmost is arranged over the space between two tumblers. The heads of the foremost and rearmost keys are arranged in front and in rear of the foremost and rearmost tumblers respectively, and these heads are inclined only on the side facing the adjacent tumbler, as shown in Figure 35.

Upon depressing a key in any one of the columns of number or word keys, the spreading head of this key engages with the tumblers on opposite sides thereof and crowds the tumblers in front of the head forwardly and those in rear of the head rearwardly. When the shifting head has been depressed to its fullest extent, the foremost tumbler bears against the front stop 367 and the rearmost tumbler bears against the rear stop 368, and the slack between the several tumblers is fully taken up.

In Figure 35, key number 5 is shown depressed fully and the slack between the tumblers is taken up, in which position of the key its shoulder 329 is engaged by the catch of the adjacent locking plate and is prevented from rising. If key number 5 was depressed erroneously and the correct key, for instance number 3 is subsequently depressed, this correct key moves downwardly idly until it engages or nearly engages the adjacent tumbler and when the correct key reaches this position, its releasing cam or convex face engages with the adjacent locking plate and shifts the same out of engagement with the locking shoulder 329 of the depressed key number 5, as shown in Figure 36, thereby releasing this key and permitting the same to rise. During the continued downward movement of the correct key number 3, the spreading head of the same moves downwardly between the adjacent tumblers and shifts the same so as to take up the slack between them. When the correct key reaches the end of its downward movement, the same is locked in this position by the adjacent locking plate in the same manner in which key number 5 was previously locked.

The slack between the several tumblers is only sufficient to permit of the full depression of one key at a time and the tumblers are so constructed that when two keys are depressed simultaneously these keys are arrested in their downward movement before their locking shoulders are engaged by the locking plate. By this means any one key in a column may be depressed and locked in its depressed position, and if an incorrect key has been depressed, the same is released by the subsequent depression of the correct key, and the correct key is in turn locked in a depressed position, but the locking of two keys at the same time in a depressed position is prevented.

It is sometimes desirable to depress several of the shifting keys simultaneously and lock the same in a depressed position. In the machine as organized no more than three shifting keys require to be depressed and locked at the same time. In order to prevent more than three shifting keys from being locked in a depressed position at the same time, the following mechanism is provided:—

370 (Fig. 37) represents a number of tumblers which are arranged in a longitudinal row below the stems of the shifting keys and each of which is secured to the lower end of a flat spring 371 depending from the underside of a supporting bar 372. Each of these tumblers has the form of an upwardly tapering wedge, as shown in Figure 37, and is capable of swinging lengthwise of the column of shifting keys but is held against transverse movement by arranging the depending springs so that their flat sides extend transversely. 373, 374 represent front and rear stops arranged in front and in rear of the foremost and rearmost tumblers 370. 375 represents a number of followers or spreading heads one of which is secured by a flat spring 376 to the lower end of the stem of each shifting key. Each of these spreading heads is preferably cylindrical in form and is capable of swinging lengthwise of the column of shifting keys, but is held against lateral movement owing to the transverse arrangement of the flat supporting spring. Upon depressing any one of the shifting keys its spreading head moves downward between the adjacent tumblers and shifts the same forward and backward from opposite sides of the spreading head. The front and rear stops 373, 374 are so arranged that the slack between the several tumblers is sufficient to allow of full depression of three shifting keys.

As shown in Figure 37, three keys are depressed fully and their followers or spreading heads have been moved between the adjacent tumblers so that the several tumblers bear against each other and against the depressed followers or heads and against the front and rear stops 373, 374, thereby taking up all of the slack between the tumblers. In order to lock these three keys in a depressed position, the same must be depressed simultaneously. If an additional key, for instance the non-printing key 176, is depressed, as shown in Figures 37 and 38, this fourth key is free to move down vardly without disturbing the previously depressed keys until its follower or head engages or nearly engages with the adjacent tumblers and when this fourth key reaches this position its releasing cam engages with the adjacent locking plate 327 and deflects the same, as shown in Figure 38, thereby disengaging the plate from all of the previously depressed keys and causing the same to rise simultaneously.

It will thus be seen that by this means three keys can be locked in a depressed position and if an error has been made in the depression of one or more of the keys, the subsequent depression of the correct key or group of three keys permits the release of the previously depressed incorrect keys and the locking of the correct keys in a depressed position. If it is desired to permit of locking more or less than three shifting keys in a depressed position, the slack space between the several tumblers must be adjusted accordingly.

Keys of different aspect

In order to enable the operator to distinguish the figures or numbers readily on the keyboard and thereby enable the same to be manipulated more rapidly, the columns of figure or number keys are arranged in groups and each group is distinguished by color or otherwise from the adjacent groups.

As shown in Figure 1, the keys in the first three columns, representing figures to the right of the decimal point or less than a whole number, are indicated in black on a white background; the second three columns of figures from the left of the decimal point to the first pointing off place, representing the whole numbers less than thousands, are indicated in white on a black background, and the third three columns of figures from the first pointing off place to the second pointing off place representing the whole numbers between hundreds and millions, are indicated in black on a white background. The characters on the shifting keys are indicated in white on a black background.

Operation

Assuming that the item "34061.97⅝" is to be registered and recorded on a bill, the operation, briefly stated, is as follows:—

All the shifting keys are released and permitted to rise, whereby all of the devices controlled by these keys are thrown out of gear excepting the recording mechanism which is thrown into gear by the rising of its shifting key 176. Then the number keys representing the numbers 34061.97 and the fraction ⅝ are depressed in their proper columns. The depression of these keys causes the key levers to be shifted so as to move the proper differential stops into the path of the controlling arms, and the detector dials 238 are turned so as to indicate the numbers of the keys which have been depressed, thereby enabling the operator to correct any error, if a wrong key has been depressed, before registering and recording the item.

If the item appears correctly on the detector dials the operator moves the handle 21 forwardly and backwardly once. During the first part of the forward movement of the handle, the main gear segments are moved forward into engagement with the dial pinions. During the next part of the forward movement of the handle, the gear segments which correspond with the depressed keys are moved downward a distance corresponding with the numbers of the depressed keys, at which point the key levers arrest the gear segments through the medium of the controlling arms. While the gear segments are effecting their registering movement, the hammers of the recording mechanism are retracted as represented in Figure 7. After the gear segments have completed their downward or registering movement the hammers are released and produce an impression of the types at the printing line. During the last part of the forward movement of the handle 21, the main gear segments are retracted out of engagement from the dial pinions and are elevated, while so retracted, to their initial position during the subsequent backward movement of the handle. During the last portion of the forward movement of the operating handle the depressed keys have been released preparatory to being again depressed for registering and recording another item.

The addition of further items of this bill is repeated in the same manner.

After all the items of a bill have been registered and recorded, the operator depresses the total printing key 84 and then moves the handle forward, whereby the total standing on the dials is printed. While the handle is in its foremost position, the operator depresses the zero key 87, thereby causing the gear segments to be moved forward into engagement with the dial pinions and turn the dials back to zero during the subsequent backward movement of the handle.

If it is desired to record the numbers in duplicate, the operator shifts the bar 191 so as to permit the duplicate hammer pawls to cause their hammers to actuate the duplicate printing types and thereby produce a separate record at the printing line, of the numbers recorded by the printing types.

The vertical ruling between the dollars and cents numbers is effected automatically, and if a cross rule is desired at the foot of a column of numbers, the operator depresses the cross ruling key 198.

When it is desired to print the same item or numbers two or more times in succession, the depression of the repeating key 354 shifts the mechanism to produce this result.

By depressing the non-printing key 176 the recording mechanism is thrown out of gear and no record is produced of the numbers.

I claim as my invention:—

1. The combination of an accumulating device, a series of keys, a movable actuating member common to all of the keys of the series, and a stop member operable by movement in a single direction of any one of the keys of the series, for limiting the movement of the actuating member.

2. The combination of an accumulating device, a series of keys, a movable actuating member common to all of the keys of the series, a stop member and means whereby said stop member may be moved to different positions by uniform movement of the different keys for controlling the movements of said actuating member.

3. In a calculating machine, the combination with a plurality of co-operating gear segments and pinions, of a shifting device whereby said segments are moved forward relatively to the pinions, stop devices which are constructed to arrest each segment in its forward movement independent of the other segments, and a support which is constructed to hold the gear segments in their initial position while the stop devices are in their shifted positions and which simultaneously releases the segments upon operating said shifting device, substantially as set forth.

4. In a calculating machine, the combination with a plurality of gear pinions and their corresponding gear segments, of a rocking support upon which the segments are pivoted and upon which the segments may turn relatively to said pinions, a shifting device whereby said support is moved for simultaneously engaging the segments with or disengaging the same from the pinions, a shifting device whereby the segments are turned on their pivots relatively to the pinions while in engagement with or out of engagement from the pinions, and stop devices whereby the several segments may be independently arrested at different points in their forward movement and each segment may be arrested in its forward movement while the other segments continue in their forward movement until arrested by their respective stop devices, substantially as set forth.

5. The combination with a dial provided with a gear pinion, and a gear segment, of an upper rock arm carrying the segment and movable toward and from the pinion, a lower rock arm connected with the upper rock arm, a cam adapted to engage the lower rock arm and move the gear segment into engagement with the pinion, a rocking frame on which said cam is pivoted, and a spring whereby the segment is disengaged from the pinion, substantially as set forth.

6. The combination with a registering mechanism provided with a gear pinion, of a gear segment adapted to mesh with said pinion, a controlling arm arranged adjacent to said gear segment, a latch mounted on the gear segment and engaging with the controlling arm, a yielding actuating device whereby the gear segment and controlling arm are yieldingly moved downward, and a positive actuating device whereby the gear segment and controlling arm are positively moved upwardly, substantially as set forth.

7. The combination with a dial provided with a gear pinion, and a gear segment, of a movable frame, a shifting device which connects the movable frame with the segment and whereby the segment is moved bodily toward and from the pinion, and a shifting device which connects the movable frame with the segment and whereby the segment is turned on its pivot.

8. In a calculating machine, the combination of a plurality of accumulators; a plurality of actuators therefor and normally out of engagement therewith; operating means by which the initial stroke of which said actuators are caused to first engage said accumulators and thereafter moved in one direction to effect simultaneous actuation of the same and means whereby said actuators are moved in the opposite direction under control of said operating mechanism.

9. In a calculating machine, the combination of a plurality of registering dials, a pinion for each of said dials, a rack for each of said pinions, a manually-actuated operation-controlling member, means operated upon the operation of said member for moving said racks to engage with said pinions for effecting simultaneous registering movement of said dials, and means whereby said member governs movement of said racks in a direction opposite to that in which they move when actuating said dials.

10. In a calculating machine, the combination of an accumulator, an actuator therefor, mechanism for effecting a reciprocating movement of said actuator, a stationary stop for limiting said movement in one direction, a stop for preventing movement of said actuator from said stationary stop, and a stop for limiting said reciprocating movement in the other of said directions.

11. In a calculating machine, the combination of accumulator pinions, actuators therefor, a shaft supporting said pinions and having its axis relatively stationary, and a shaft on which said actuators are mounted and which is itself movable relatively to the first said shaft for bringing said actuators simultaneously into engagement with said pinions for simultaneously actuating a plurality of said accumulator pinions.

12. In a calculating machine, the combination of a plurality of accumulator wheels, an actuating gear member for each of said wheels and normally out of engagement therewith, a series of keys for each of said wheels, stops separate from and controlled by said keys for controlling movement of said actuating gear members, and a manually-actuated operation-controlling member operable for effecting engagement of said wheels and said actuating gear members and causing said members to actuate said wheels according to the setting of said stops by said keys.

13. In a register, the combination with a plurality of accumulator wheels, of a frame; a plurality of accumulator-operating racks pivotally mounted on said frame; a plurality of series of keys; each series of keys controlling a respective one of said racks; means controlled by said keys for limiting the movements of said racks; and means for rocking the rack-carrying frame to bring said racks into mesh with said accumulator wheels and for moving said racks to actuate said accumulator wheels.

14. In a calculating machine, the combination of a plurality of accumulators, actuators therefor, a hand-controlled operation-controlling member, cam means controlled by said member for effecting engagement of said accumulators and actuators, and a second means for effecting engagement of said accumulators and actuators.

15. In a calculating machine, the combination of a plurality of accumulator pinions, carrying tripping devices between each lower pinion and its next higher pinion, a plurality of actuating gear members for actuating said accumulator pinions, setting devices, a plurality of springs one for each of said gear members and capable of operating the same to actuate one of such pinions to accumulate according to the setting of said setting devices and also capable of operating said actuating member under control of the carrying tripping device between a pinion actuated thereby and the pinion of next lower order, for effecting carrying from the said pinion of next lower order and an element movable an invariable extent on each operation of the machine and adapted to vary the lengths of said springs differential amounts depending upon the extents of movement of the respective actuating members.

16. In a calculating machine, the combination of an accumulator, an actuating rack therefor, a pivot for said actuating rack, a printing segment operable to print the items accumulated on said accumulator, said printing segment being movable with and controllable by said actuating rack, a pivot for said printing segment and different from the pivot of said actuating rack, and mechanisms for moving said actuating rack and printing segment, said mechanisms permitting said actuating rack to move independently of said printing segment.

17. In a calculating machine, the combination of an accumulator, an actuator gear member therefor, a pivot for said actuator gear member and operable to move with said gear member to carry the latter into and out of engagement with said accumulator, a printing member operable to effect printing of items accumulated on said accumulators, a stationary pivot for said printing member, means for guiding said gear member in its movements into and out of engagement with said accumulator, and operating mechanism for operating said actuator gear member and said printing member.

18. In a calculating machine, the combination of an accumulator, an actuator therefor, a plurality of limiting stop-elements for determining the extent of the operative excursions of said actuator and normally out of arresting position with relation to said actuator, keys adapted when depressed to engage and move said stops into actuator arresting position, and a normal stop-element normally in arresting position with relation to said actuator and adapted to be displaced by the movement into actuator arresting position of any of said limiting stop-elements.

19. In a calculating machine, the combination of a plurality of accumulators, printing mechanism for printing items registered on said accumulators, stop mechanism for controlling the items registered on said accumulators and printed by said printing mechanism, operating mechanism for operating said accumulators and printing mechanism according to the control of said stop mechanism, and a total key and connections cooperative with said operating mechanism for causing said stop mechanism to control the printing mechanism according to the total standing on said accumulators.

20. In a calculating machine, the combination of accumulating mechanism, number setting keys therefor, a movable member adapted to be moved by the depression of the keys a distance determined by the value of the depressed key, means controlled by said member for effecting control of the items to be accumulated on said accumulating mechanism and a hand controlled operation-controlling member for controlling actuation of said accumulating mechanism according to the control of said number keys.

21. In a calculating machine, the combination with a gear pinion and its co-operating gear segment, adapted to be engaged and disengaged, of a movable controlling shoulder operatively connected with said segment, and a movable stop member provided with a plurality of fixed stops which are arranged differentially and adapted to arrest forward movement of said shoulder and segment at different points, substantially as set forth.

22. The combination with a dial provided with a gear pinion, and a gear segment co-operative with the pinion, of a pivoted stop member provided with a series of stops or shoulders which are adapted to arrest the segment at different points in its forward movement and which are arranged radially out of line with one another and different distances from the pivot of the stop member, substantially as set forth.

23. The combination with a registering device provided with a movable stop, of a key lever having one of its arms provided with a differential series of stops any of which is adapted to be engaged by the stop of the registering device to arrest the same at different points in its forward movement, and a series of keys arranged to bear against the other arm of the key lever at different distances from its pivot, substantially as set forth.

24. The combination with a gear pinion, of a gear segment adapted to mesh with said pinion, a support carrying the gear segment and movable toward and from said pinion, a controlling arm loosely connected with the gear segment and turning on a fixed pivot, a series of differential stops, whereby the controlling arm may be arrested at different points in its forward movement, and a printing segment connected with said controlling arm and provided with types.

25. In a calculating machine, the combination with a movable printing device, a registering device comprising a gear pinion and actuator therefor said pinion and actuator being engageable with and disengageable from each other, and operating mechanism for moving said actuator and said printing device; of a member provided with a series of differential stops whereby the printing device and said actuator may be arrested at different points in their movement, substantially as set forth.

26. In a calculating machine a series of keys and a movable controlling member common to all of the keys of the series, and means operated by any one of the keys of the series for stopping the controlling member in a position corresponding to the key operated, said means comprising a pivoted stop lever arranged to be differentially positioned by the different keys, substantially as described.

27. In a calculating machine, the combination of an accumulator, an actuating member therefor, a differential stop member for controlling the excursions of said actuating member, and a plurality of keys each movable independently of the others and adapted when so moved to move said differential stop member to a corresponding actuator controlling position.

28. In a calculating machine, the combination with a totalizer wheel, of a shouldered actuating device therefor, a lever comprising on one side of its pivot a series of stops in the path of movement of said shoulder, and means for positioning certain of said stops to arrest said actuating devices in one of nine different positions, and a stop device comprising a second shoulder on said actuating device for holding said actuating device against movement in the zero position.

29. In a calculating machine, the combination with totalizer wheels, shouldered actuating devices for said wheels comprising a plurality of stop shoulders, a unitary member comprising zero and digit stops arranged in series in the paths of movement of the respective shoulders on said actuating devices, means for moving said member to bring said stops into the path of movement of the shoulders on said actuating devices whereby said actuating devices are prevented from moving by the positioned zero stops or permitted to move until arrested by the positioned digit stops.

30. In a calculating machine, the combination of a register, an actuating member therefor, and a stop member normally operative for holding said actuating member against movement, and movable to positions to limit the actuating movements of said actuating member.

31. In a calculating machine, the combination of an accumulator, an actuator therefor, a differential stop element movable to different positions for determining the extent of actuation of said accumulator by said actuator, a controlling element for controlling said differential stop element, and a plurality of keys each of which may be moved independently of the others for actuating said controlling element.

32. In a calculating machine, the combination of a plurality of accumulators; a plurality of rack members, one for each of a plurality of said accumulators for actuating the same; a plurality of differential stop members, one for each of a plurality of said rack members, for stopping the accumulator actuating movement of said rack members, said rack members being provided with means permitting an extra movement of each of a plurality of them independent of said differential stop members for effecting carrying, and a plurality of carrying devices controlled by said accumulators for effecting said independent movement of said rack members.

33. In a calculating machine, the combination of a plurality of accumulators; a plurality of series of keys, one series for each of a plurality of said accumulators; each key being capable of movement for controlling the accumulations on its respective accumulator without effecting movement of any other of said keys; a plurality of stop members each comprising a series of stops, one stop member for each series of keys and controllable thereby the stops of each member being immovable with relation to each other; and a hand-controlled operation-controlling member for operating said accumulators according to the control of said stop members as determined by said keys, without effecting movement of the keys not in use.

34. In a calculating machine, the combination of a plurality of accumulator gear wheels, a plurality of actuators for actuating said accumulator gear wheels, pivoting means for said actuators, a plurality of controlling members for controlling the excursions of said actuators, a plurality of rows of controlling keys a plurality of which keys may be depressed to simultaneously control a plurality of said controlling members for controlling a plurality of said actuators according to the values of the keys depressed, and operating means for operating said pivoting means of said actuators to move said actuators into and out of engagement with said accumulator gear wheels, and for operating said actuators to operate said accumulator gear wheels according to the control of said controlling members.

35. In a calculating machine, the combination of a plurality of accumulator gear wheels; a plurality of actuators, one actuator for each gear wheel of a plurality of said gear wheels, said actuators being normally out of engagement and mounted for movement into engagement with their respective gear wheels; a plurality of controlling members, one controlling member for each of a plurality of said actuators for controlling excursions thereof; a plurality of rows of value keys, one row for each controlling member of a plurality of said controlling members, each of said keys being operable to move its respective controlling member to a position for controlling the respective actuator according to the value of the key depressed, and operating means for operating said actuators to engage their respective gear wheels and operate the latter according to the control of the respective controlling members.

36. In a calculating machine, the combination with adding and recording mechanism, of actuators for operating the same; a total key or lever, stop means normally preventing movement of said actuators and means controllable by the total key whereby movement of such of said actuators as should move is permitted and whereby unnecessary forward movement of said actuators is restrained.

37. In a calculating machine, the combination of an accumulator, an actuator for actuating said accumulator various amounts, a differential stop member movable to different positions for controlling said actuator, and manipulative means comprising a series of settable keys adapted when set to displace said differential stop member, the construction being such that said differential stop member is moved the greatest distance to control the actuator to actuate said accumulator for the least amount.

38. In a calculating machine, the combination of an accumulator, an actuator therefor, a differential stop member comprising a zero stop and a plurality of value stops, said stops being co-operative with said actuator for controlling the operation of said accumulator by said actuator, and means for moving said differential stop member in one direction to bring its zero stop into co-operation with said actuator and in another direction to bring one of said value stops into co-operation with said actuator.

39. In a calculating machine, the combination of a plurality of accumulators; a plurality of differentially positionable members, one for each of a plurality of said accumulators for controlling the accumulations thereon; printing mechanism for printing items accumulated on said accumulators; a total key for causing said differentially positionable members to control said printing mechanism for printing the amount accumulated on said accumulators; automatic means for holding said total key in controlling position; and operating mechanism for operating said accumulators and said printing mechanism and for effecting the release of said total key from said automatic means.

40. In a calculating machine, the combination of an accumulator, a differential stop member for controlling accumulating movements of said accumulator, a plurality of settable keys effective on their setting movement to variably position said differential stop member and each being movable to operative position without affecting any other of said keys which is in normal inoperative position, and means other than said keys for driving said accumulator according to the control of said differential stop member as determined by said keys.

41. In a calculating machine, the combination of an accumulator, an actuator therefor, a plurality of depressible number keys for controlling said actuator each of which keys may be moved to its operative position without moving any other of said keys, which is in normal inoperative position, a controlling member common to and settable by the depression of more than one of said keys for controlling differential movement of said actuator, and means other than said keys for driving said actuator to actuate said accumulator in accordance with the control of said controlling keys.

42. In a calculating machine, the combination of a plurality of accumulators, printing mechanism for printing items accumulated on said accumulators, and differential stop mechanism which can be controlled by said accumulators for controlling said printing mechanism to print the amount accumulated on said accumulators.

43. In a calculating machine, the combination of a plurality of accumulators, printing mechanism for printing items accumulated on said accumulators, differential stop mechanism for controlling said accumulators and printing mechanism, and means for effecting positioning of said stop mechanism according to the amount registered on said accumulators without turning said accumulators to zero, for thereby controlling said printing mechanism to effect printing of said amount registered on said accumulators.

44. In a calculating machine, the combination of a plurality of accumulators; actuators therefor, a plurality of pivotally mounted stop members, for controlling movement of said actuators, each of said stop members being individually and differentially movable about its pivot; a plurality of series of number keys, the keys of each series being operable for controlling movement of the associated stop member only about its pivot; and operating mechanism for operating said actuators to actuate said accumulators according to the control of said stop members as determined by said keys.

45. In a calculating machine, the combination of an accumulator, a controlling member therefor, a plurality of keys by adjustment and readjustment of which said controlling member may be adjusted and readjusted for effecting different controls of said accumulator, and means whereby adjustment of any of said keys causes a previously adjusted key to be restored to normal position.

46. In a calculating machine, the combination of an accumulator; a controlling member therefor comprising a plurality of stops; a plurality of keys, each movable from normal ineffective position to effective position without causing movement of any other of said keys which may be in normal position, each of said keys being operable to control movement of said controlling member to position a respective one of said stops in controlling position, and each of said keys being operable after another of said keys has been operated and before operation of said machine, to nullify the effect of the key first operated and to control readjustment of said member to position another of its stops according to the key last operated; and operating mechanism for operating said accumulator according to the control of said controlling member as determined by the final adjustment of said keys.

47. The combination with a dial provided with a gear pinion, of a gear segment having a bodily movement toward and from said pinion and a rocking movement on its pivot with reference to the pinion, an operating member and connections whereby said operating member effects said bodily movement of said gear segment, a controlling arm turning on a fixed pivot and loosely connected with the segment, and a controlling device whereby the forward or downward movement of the controlling arm and segment is controlled, substantially as set forth.

48. In a calculating machine, the combination of an accumulator, an actuator therefor, a controlling arm for said actuator adapted to guide said actuator into and out of engagement with said accumulator, and means for moving said actuator into and out of engagement with said accumulator.

49. In a calculating machine, the combination of an accumulator, an actuator therefor, a controlling member for said actuator, means for moving said actuator relatively to said controlling member in one direction for effecting engagement of said actuator and accumulator, and means for moving said actuator relatively to said controlling arm in another direction for effecting operation of said accumulator.

50. The combination with a register provided with a gear pinion, of a gear segment adapted to move into and out of engagement with said pinion, a pawl adapted to move into and out of engagement with said pinion, and means associated with the gear segment and the pawl and operating to move the pawl out of engagement from the pinion when the segment moves into engagement with the pinion and to move the pawl into engagement with the pinion when the segment moves out of engagement therefrom, substantially as set forth.

51. In a calculating machine, the combination of a plurality of accumulators, a plurality of actuators for said accumulators and normally out of engagement therewith, a plurality of detents normally engaged with said accumulators for preventing disturbing of the same when out of engagement with said actuators, and means for effecting engagement of said accumulators and actuators and concomitantly effecting disengagement of said accumulators and detents.

52. In a calculating machine, the combination of a plurality of registers, a plurality of gear pinions one for each of a plurality of said registers, a plurality of actuating gear members one for each of a plurality of said gear pinions, a plurality of differential stop plates one for each of a plurality of said actuating gear members for controlling the movement thereof, shifting mechanism for engaging each of said actuating gear members with its respective gear pinion, and a detent device operable by said shifting mechanism and whereby said pinions are locked against rotation when out of engagement with their actuating gear members.

53. In a calculating mechanism, the combination with registering mechanism, of a series of key-controlled movable members adapted to co-operate therewith, means for shifting said members into and out of co-operative relation with the registering mechanism, and means constructed and arranged to be automatically operated for locking said registering mechanism against displacement when said members are shifted out of co-operation therewith.

54. A calculating machine comprising a set of key-controlled accumulator-controlling members widely spaced apart, types for printing in accordance with calculations of the machine, a set of type-controlling members narrowly spaced apart, a shaft on which said accumulator-controlling members and said type-controlling members are immediately pivoted in such relations that the pivoted ends of some of the narrowly spaced type-controlling members extend between the adjacent widely-spaced members, and a plurality of rigid connectors each of which extends from one of said widely spaced members to a respective one of said narrowly spaced members and rigidly connecting them so that they turn in unison on said shaft.

55. The combination with a number of registering devices, each of which is provided with a gear pinion and a co-operating gear segment, of a key-controlled device whereby the movement of each segment and pinion is controlled, a movable latch mounted on each segment and adapted to engage with its corresponding controlling device, and a trip device which is controlled by each lower registering device and which is adapted to disengage the latch of the next higher segment from its controlling device, substantially as set forth.

56. In a calculating machine, the combination of a plurality of accumulators of progressive denominational orders and provided with a plurality of controlling keys, an actuator for each of said accumulators for actuating each respective accumulator according to the control of said keys, an accumulator of a denominational order higher than that of any of said plurality of accumulators, an actuator for the last said accumulator, means for detaining the last said actuator against actuating movement other than for carrying during the additive operations of the machine, a frame operable for effecting the release of the last said actuator from the detaining means and permitting movement of all of said actuators, and a controlling key for effecting operation of said frame.

57. In a calculating machine, the combination of a plurality of accumulators of progressive denominational orders and provided with a plurality of controlling keys, an actuator for each of said accumulators for actuating each respective accumulator according to the control of said keys, an accumulator of a denominational order higher than that of any of said plurality of accumulators and unprovided with controlling keys, an actuator for the last said accumulator, and total printing means operable to control actuation of all of said actuators.

58. In a calculating machine, the combination of a plurality of accumulators of progressive denominational orders and provided with a plurality of controlling keys, an actuators for each of said accumulators for actuating each respective accumulator according to the control of said keys, printing mechanism operable to print the amounts accumulated on said accumulators, an accumulator of a denominational order higher than that of any of said plurality of accumulators, an actuator for the last said accumulator, means for detaining the last said actuator against actuating movement other than for carrying during the additive operations of the machine, and a total key operable to permit actuation of all of said actuators for effecting printing by said printing mechanism of the total on all of said accumulators.

59. In a calculating machine, the combination with a plurality of accumulators, one comprising a dial divided into a number of bearing spaces different from the others and a plurality of number printing devices of different denominational order, of mechanism for operating said printing devices to print desired numbers, means whereby the operation of one of said devices effects operation of all of said printing devices of lower order which have not been operated by said mechanism, and a separate number printing device of next lower denominational order to that device of said plurality of devices which is of lowest order, said separate number printing device being independent of said means and operable by said mechanism for printing in conjunction with any of said plurality of number printing devices.

60. In a calculating machine, the combination of a plurality of number printing devices; interlocking means from one to another of said printing devices, all of said devices being operatively related to said means; a separate printing device independent of said plurality of devices and means, but operable to print in conjunction with printing by any of said plurality of printing devices, the matter printed by said separate printing device being related to the matter conjointly printed by said plurality of devices; and common operating mechanism for all of said devices.

61. The combination with a registering mechanism, of a setting mechanism, a plurality of keys uniformly adjustable to operate said setting mechanism, an operating mechanism whereby the registering mechanism is shifted according to the relation of the setting mechanism to the registering mechanism, and an indicator which moves in unison with the setting mechanism and which enables the operator to determine the relation of the setting mechanism to the registering mechanism before the registration is effected, substantially as set forth.

62. In a calculating machine, the combination of an accumulating mechanism comprising a set of accumulators, a plurality of sets of setting keys one set for controlling each accumulator of said accumulating mechanism, and each key in any row being shiftable to determine the extent of movement of the related accumulator without effecting movement of other keys in the row, a plurality of indicator dials each of a plurality of said indicator dials being settable by a plurality of keys of a respective set of said keys to indicate the item to be accumulated, and operating means for operating said accumulating mechanism and effecting the return of said keys and indicators during the same operation for which they are set.

63. In a calculating machine, the combination of an accumulating mechanism comprising a set of accumulators, means for actuating them to accumulate items, and an indicating mechanism which normally does not indicate the total accumulated on said accumulators and which is automatically operable for visibly indicating the total accumulated on said accumulators.

64. In a calculating machine, the combination of an accumulating mechanism, actuators for actuating said accumulating mechanism, keys for setting up items to be accumulated on said accumulating mechanism, indicating means separate from said keys for indicating the items set up on the keys, printing mechanism for printing the items set up on said keys and accumulated on said accumulating mechanism, and means co-operative with said printing mechanism for effecting printing of the total amounts accumulated on said accumulating mechanism.

65. The combination of calculating mechanism, a total indicator therefor, an item indicator, a movable differential stop member operable to control said total indicator and item indicator, a series of manipulative members, and means whereby uniform movement of different manipulative members effects movement of said stop member into different positions.

66. The combination of calculating mechanism, a total indicator, an item indicator, means for actuating said total indicator, a differentially settable member which controls the amount of movement of said calculating mechanism and determines the amount indicated on said item indicator, and a plurality of manipulative elements each movable independently of the others for producing differential movement of said member.

67. The combination of a total indicator, an actuator for causing calculating movement of said total indicator, an item indicator, manipulative means which by uniform movements differentially controls said movements of said total indicator and actuates said item indicator, and operating means for operating said total indicator according to the control of said manipulative means to totalize the item indicated by the item indicator.

68. In a calculating machine, the combination of a plurality of accumulator dials; a plurality of series of number setting keys, one series for each of a plurality of said dials, for setting up items to be registered on said accumulator dials; a hand-controlled operation-controlling member for effecting operation of said dials according to the control of said keys; a plurality of indicators one for each of a plurality of said dials for indicating items registered on said dials; and reading means for said accumulator dials constructed to indicate to the operator at each operation the total registered on said dials.

69. In a calculating machine, the combination of a plurality of accumulator dials; reading means for said dials constructed to indicate to the operator at each operation of said machine the total amount registered on said accumulator dials; a plurality of series of number setting keys, one series for each of a plurality of said accumulator dials, for setting up items to be registered on said accumulator dials; a plurality of indicators one for each of a plurality of said accumulator dials for indicating items set up on said number keys; a printing mechanism for printing the items registered on said accumulator dials; and means co-operative with said accumulator dials and printing mechanism for effecting printing of the amount standing on said dials.

70. In a calculating machine, the combination of a plurality of accumulators, a plurality of keys each individually movable for controlling said accumulators, stops controllable by the individual movement of said keys for controlling items registered on said accumulators, and a plurality of indicators one for each of said accumulators and each actuated to indicate as a key is operated to control the respective one of the accumulators and returned to normal concomitantly with the return to normal of the stop controlled by the depression of said key.

71. In a calculating machine, the combination of a plurality of accumulators; a plurality of series of keys, the keys of each series being individually movable to control the associated accumulator, one series for each of said accumulators; stops controllable by said keys for controlling items registered on said accumulators; a plurality of indicators, one for each of said accumulators and each actuated to indicate as a key of a respective series is operated to control the respective one of said accumulators; and key returning mechanism operable for returning said key to normal position without effecting the return of said indicator to normal position.

72. In a calculating machine, the combination of a plurality of accumulators, actuating mechanism therefor, number setting keys for setting up numbers to be totalized on said accumulators, printing mechanism for printing items totalized on said accumulators, means for effecting printing by said printing mechanism of the total standing on said accumulators, and indicating mechanism for indicating the items set up on said keys and for indicating said total when set up by said means.

73. In a calculating machine, the combination of a plurality of accumulators; a plurality of actuators, one actuator for each accumulator of a plurality of said accumulators; a plurality of rows of depressible number setting keys, one row for each actuator of a plurality of said actuators, and operable for controlling their respective actuators; a plurality of rotary indicators, one indicator for each row of a plurality of said rows of keys, and each operable by the keys of its respective row to indicate the numbers set up thereby upon the depression of said keys; and operating means for causing said actuators to actuate said accumulators according to the setting of said keys and the indication of said indicators.

74. A calculating machine comprising a plurality of accumulator wheels, a plurality of printing types, an operating member for operating said accumulator wheels and said types, keys operable for controlling the extent of operation of said accumulator wheels by said operating member so as to cause said accumulating wheels to accumulate items into totals and for causing said types to print the items accumulated, manipulative means for controlling said types to print said totals, and item indicators operable by said keys independently of said operating member.

75. In a calculating machine, the combination of a plurality of accumulators; a plurality of actuators, one actuator for each accumulator of a plurality of said accumulators; a plurality of rows of number setting keys, one row for each actuator of a plurality of said actuators, and operable for controlling their respective actuators; printing mechanism for printing items accumulated on said accumulators; mechanism for effecting printing by said printing mechanism of the total amount standing on said accumulators; and a plurality of indicators, one indicator for each row of a plurality of said rows of keys, and each operable by the keys of its respective row to indicate the numbers set up thereby.

76. In a calculating machine, the combination of a plurality of item indicators, means for moving said indicators to indicate an item, locking means for locking said indicators in indicating position, means for returning said indicators to normal position, and a hand-controlled operation-controlling member operable to release said locking means and permit said returning means to return said indicators to normal position upon the first operation of said operation-controlling member after said indicators are moved to indicate.

77. In an adding machine the combination of a plurality of registering dials; a printing device comprising a plurality of sets of number types including a set for each registering dial, and adapted to contemporaneously print the figures of a number consisting of a plurality of digits; a plurality of series of digit setting keys one series for each registering dial and its co-operating printing types which keys may be set and left set for controlling without actuating said registering wheels and for controlling without positioning said printing types; a rotatable platen for supporting a record sheet and upon which said printing types may impinge; a hand controlled operating device for actuating said registering dials to register and said printing device to print according to the setting of said setting keys and for effecting the restoration of the set setting keys; a sub-total key which may be actuated to cause said printing mechanism to print the total registered on said dials and without clearing the same when said operating device is actuated; and means comprising a second key and which may be actuated to cause said printing mechanism to print the total registered on said dials and leave said dials in their cleared or zero position when said operating device is actuated.

78. The combination with an accumulator of a denominational series of keys; a spring-pressed member acting to lock the keys in their depressed positions, said member being moved by the keys as they are depressed and thus adapted to release any key previously depressed, an adjustable bar positioned and held by the depressed keys and adapted to be readjusted by the depression of a second key; an actuator for said accumulator and whose movements are controlled by said bar, and means for moving said actuator to effect actuation of said accumulator according to the control of the key last depressed.

79. The combination with an accumulator of a denominational series of keys, a spring-pressed swinging plate acting to lock the keys in their depressed positions, said plate being swung by the keys as they are depressed and thus adapted to release any key previously depressed, a differentially adjustable bar positioned and held by any depressed key, an actuator for said accumulator and whose movements are regulated by the bar, and means for operating the actuator to effect actuation of said accumulator according to the control of the key last depressed.

80. In a calculating machine, the combination of accumulating mechanism actuating mechanism therefor a differential stop member for controlling the effect of said actuating mechanism, a main supporting frame for supporting said mechanisms, a key supporting frame rigidly mounted on said main supporting frame, a plurality of keys supported by said key supporting frame for controlling the positioning of said differential stop device, and means for locking any of said keys in depressed position when depressed and permitting the depression of a second of said keys to effect the release of the key previously depressed.

81. In a calculating machine, the combination of an accumulator, an actuator therefor, a differential stop member for limiting the movement of said actuator, a plurality of number setting keys for determining the position at which said differential stop member shall stop said actuator, and means for locking any of said keys in depressed position when depressed and permitting the depression of a second of said keys to effect the release of the key previously depressed thereby repositioning said differential stop member.

82. The combination of register wheels, racks for rotating the same, detaining means for said racks, stops for controlling the movement of said racks, a series of keys for each rack, means for locking any one of said keys when depresssed, means whereby the depression of a second key in the same series operates to release any previously depressed key of its series, and means whereby the movement of a stop under control of its number key operates to release said detaining means.

83. In an adding-machine provided with a series of keys arranged in a bank, a numeral wheel co-operating with said keys, a rack for operating the numeral-wheel and a row of stops for controlling the movement of the rack, the combination of connection-means between said keys and stops whereby each stop may be rendered effective upon depressing its respective key, and means for automatically retaining any stop in its effective position and for automatically releasing any effective stop upon the depression of another key of said series.

84. In a calculating machine, the combination of a plurality of accumulator wheels, a series of setting keys for each of said wheels, differentially arranged stops mounted to be moved from normally ineffective position to effective position by the operation of said keys, means whereby the operation of a second key in any series will render the effective stop ineffective and render the stop corresponding the said second key effective, and means for operating said accumulator wheels in accordance with the keys last set.

85. In a calculating machine, the combination of an accumulator, a stationary keyboard comprising setting keys, setting mechanism which may be set by said setting keys for controlling the accumulations on said accumulator, means for holding said keys in set position, means for releasing said keys from said holding means, and means for holding said setting mechanism in set position after said keys have been released.

86. In a calculating machine, the combination of a plurality of accumulators; a stationary keyboard comprising a plurality of number setting keys for controlling the items registered on said accumulators, each of said keys being movable from normal ineffective position to effective position without effecting movement of any other of said keys which may be in normal position, and each of said keys remaining in said effective position when moved thereto; printing mechanism controllable by said number keys for printing items registered on said accumulators; a total key operable to control said printing mechanism to print the total standing on said accumulators and under control of said accumulators, and operable to effect return to normal ineffective position of any of said number keys which may have been moved to effective position; and operating mechanism for operating said accumulators and printing mechanism according to the control of said number and total keys and for effecting return to normal ineffective position of any of said number keys which may have been moved to effective position, such return being effected at a point of time in the operation of said operating mechanism which is nearer the middle of the operation than the end thereof.

87. In a calculating machine, the combination of a plurality of accumulators; a plurality of number keys for controlling the items to be registered on said accumulators; printing mechanism controllable by said keys for printing items registered on said accumulators; a total key which is movable from normal ineffective position to effective position to remain in effective position when moved thereto for effecting printing by said printing mechanism of the total standing on said accumulators and under control of said accumulators; and operating mechanism for operating said accumulators and printing mechanism according to the control of said number and total keys and for effecting restoration of said total key to normal ineffective position at a point of time in a total taking operation of said operating mechanism which is nearer the middle of such operation than the end thereof.

88. The combination with a registering device which is provided with a gear pinion, of a gear segment adapted to move bodily toward and from the pinion and to turn on its pivot with reference to the pinion, and a shifting device which is controlled by the registering device and which controls the extent of the turning movement of the segment on its pivot, substantially as set forth.

89. In a calculating machine, the combination of a set of accumulators, a normally effective cam correlated with said accumulators for conditioning said set of accumulators to perform a certain function, a normally ineffective cam correlated with said accumulators to cause said set of accumulators to perform another function, and key-controlled means for rendering the first said cam ineffective and rendering the second said cam effective.

90. In a calculating machine, the combination of accumulators, number keys, stops controllable by said keys for determining the extent of actuation of said accumulators, a second means for controlling the operation of said stops, and a manipulative member for controlling said means.

91. In a calculating machine, the combination of an accumulator, an actuator therefor, a stop device for said actuator, number keys for controlling said stop device, and a second means and controllable by said accumulator for controlling said stop device.

92. In a calculating machine, the combination of a plurality of accumulator gear pinions; a plurality of racks operable to effect accumulating on said accumulator pinions and to effect carrying from pinions of lower order to pinions of higher order; printing types; a hand-controlled operation controlling member; mechanism controllable by said member for effecting actuating and carrying movements of said racks to effect accumulating by said gear pinions of items and for effecting printing of said items by said printing types; and mechanism under the control of a settable key for operation by said hand-controlled operation-controlling member, during an operation of the latter which immediately succeeds an item-accumulating operation, for effecting printing by said types under control of said accumulator pinions of the total accumulated on said pinions.

93. In a calculating machine, the combination of calculating mechanism, numeral types operable for printing on a record sheet items registered on said calculating mechanism, and a plurality of keys co-operative with said calculating mechanism and said types to effect printing of the total registered on said calculating mechanism without clearing the latter and to effect printing of the total registered on said calculating mechanism and clearing of the latter.

94. In a calculating machine, the combination of calculating mechanism, numeral types operable for printing on a record sheet items registered on said calculating mechanism, and a plurality of keys for taking totals and sub-totals one of which keys may be set and automatically detained in set position for controlling the printing by said numeral types of the amount standing on the calculating mechanism without clearing the latter.

95. In a calculating machine, the combination of accumulating mechanism, printing mechanism for printing the items accumulated on said accumulating mechanism, means for determining the items to be accumulated and printed, a sub-total key co-operative with said printing mechanism for effecting printing of the total of the items standing on said accumulating mechanism without clearing the same, and key-controllable means for effecting the printing of the total of the items standing on said accumulating mechanism and clearing the same.

96. In a calculating machine, the combination of an accumulating mechanism, printing mechanism for printing the items to be accumulated on said accumulating mechanism, and a sub-total key which is co-operative with said printing devices for effecting printing of the total of the items on said accumulating mechanism, and incapable of effecting clearing of said accumulating mechanism.

97. In a calculating machine, the combination of a plurality of accumulators, a plurality of devices controlled thereby and each device comprising a mechanical representation of the digits one to nine and zero, printing mechanism for printing the items registered on said accumulators, stops for determining the amounts to be accumulated on said accumulators and printed by said printing mechanism, and means whereby said devices may control said stops for effecting printing by said printing mechanism of the total amount registered on said accumulators.

98. In a calculating machine, the combination of a plurality of accumulators; a plurality of devices controllable thereby, each of said devices comprising a mechanical representation of the digits 0–9; stops for controlling the items to be registered on said accumulators; actuators for actuating said registers according to the control of said stops and means whereby said devices may be caused to control said stops for controlling the movements of said actuators for effecting the return of said accumulators to zero.

99. In a calculating machine, comprising a plurality of accumulators, printing mechanism co-operative therewith, and number keys for controlling the accumulations on said accumulators; the combination of a finger-piece movable from normally inoperative position to an operative position and co-operative with said accumulators and said printing mechanism for printing totals, a spring pressed detent member, and a shoulder operable by said finger-piece and adapted to co-operate with said detent member for detaining said finger-piece in operative position.

100. In a calculating machine, comprising a plurality of accumulators, printing mechanism co-operative therewith, and number keys for controlling the accumulations on said accumulators, the combination of a finger-piece movable from normally inoperative position to an operative position and co-operative with said accumulators and said printing mechanism for printing totals, a spring pressed detent member, and means for automatically releasing said finger-piece from the influence of said detent member.

101. In a calculating machine, the combination of a plurality of registers, printing mechanism for printing the items accumulated on said registers, operating mechanism for operating said registers and said printing mechanism, key-controlled mechanism for effecting printing by said printing mechanism of the amount standing on said registers without leaving them at zero, locking means nondependent on said operating mechanism for detaining said key-controlled mechanism in operative position, and mechanism co-operative with said locking means and operable by said operating mechanism for effecting release of said key-controlled mechanism from said locking mechanism.

102. In a calculating machine, the combination of an accumulating mechanism, printing mechanism, and manipulative means for causing said printing mechanism to print a total from said accumulating mechanism and for thereafter causing said accumulating mechanism to be cleared, all in the same operation of the machine.

103. In a calculating machine, the combination of a plurality of accumulators, a plurality of number setting keys for controlling the same, detaining elements for detaining said keys in set position when set, restoring elements for automatically restoring said keys to normal position when released from said detaining elements, printing mechanism for printing the items set up on said number keys and registered on said accumulators, and a total key operable for causing said detaining elements to release said keys and permit said restoring elements to restore such as have been set, and co-operative with said printing mechanism and said accumulators for effecting printing of the total registered on said accumulators.

104. In a calculating machine, the combination of a plurality of accumulators, a plurality of number setting keys for controlling the same, detaining elements for detaining said keys in set position when set, restoring elements for automatically restoring said keys to normal position when released from said detaining elements, printing mechanism for printing the items set up on said number keys and registered on said accumulators, and a total key operable for causing said detaining elements to release said keys and permit said restoring elements to restore such as have been set, and co-operative with said printing mechanism and said accumulators for effecting printing of the total registered on said accumulators without effecting clearing of said accumulators.

105. In a calculating machine, the combination of a plurality of accumulators, a plurality of number setting keys for controlling the same, detaining elements for detaining said keys in set position when set, restoring elements for automatically restoring said keys to normal position when released from said detaining elements, and a shifting key operable for causing said detaining elements to release said keys and permit said restoring elements to restore such as have been set, and co-operative with said accumulators for effecting turning to zero of said accumulators.

106. In a calculating machine, the combination with a gear pinion and its co-operating gear segment, of a support whereby the segment is carried into engagement with and out of engagement from the pinion, a shifting device whereby the segment may be moved forward while retracted or out of engagement from the pinion, a differential stop device whereby the segment may be arrested at different points in its forward movement and a shifting device whereby the segment is engaged with the pinion while in its forward position, and held in this position during the subsequent return movement of the segment for the purpose of turning the pinion backwardly, substantially as set forth.

107. In a calculating machine, the combination of a plurality of accumulators, a plurality of number setting keys for controlling the same, printing mechanism operable to print the items set up on said number keys and registered on said accumulators, means comprising a plurality of shifting keys which keys are operable for effecting printing of the amount standing on said accumulators and clearing the same and for printing the amount standing on said accumulators without clearing the same, and elements operable by each of said shifting keys for effecting restoration of any of said number keys which may be in set position.

108. In a calculating machine, the combination of accumulating and printing mechanisms capable of performing a plurality of functions, a plurality of total and other shifting keys identified with said mechanisms for each controlling a respective one of said functions, a common locking plate for said keys, and operating mechanism for operating said accumulating and printing mechanisms and for causing said locking plate to release any of said shifting keys locked thereby.

109. In a calculating machine, the combination of a plurality of accumulators, a plurality of rack members for controlling the registering of items on said accumulators, printing mechanism for printing items registered on said accumulators, operating mechanism for operating said racks and printing mechanism, a total key, and means correlated with said total key and operating mechanism for determining the movement of said racks so as to effect printing by said printing mechanism of the total amount standing on said accumulators during the first part of the operation of said operating mechanism, and for preventing further movement of said racks in the same direction during the remaining part of the operation of said operating mechanism.

110. In a calculating machine, the combination of a plurality of accumulators, a plurality of number setting keys, means for holding said keys in set position when set, printing mechanism for printing items set up on said setting keys, means comprising a plurality of special keys for effecting printing by said printing mechanism of the total standing on said accumulators and clearing of the same and for effecting printing by said printing mechanism of the total standing on said accumulators and retaining said total in said accumulators, and means whereby the depression of each of said special keys effects release from said holding means of any of said setting keys which may be set.

111. In a calculating machine, the combination of a plurality of accumulators; printing mechanism for printing items registered on said accumulators; a key mechanism comprising a plurality of rows of keys, a plurality of which rows are number setting keys for controlling the items accumulated on said accumulators and printed by said printing mechanism, and one of which rows comprises a plurality of total and other functional keys; a plurality of locking devices, one locking device for each of said rows of keys and adapted to lock each of the keys thereof; and operating means for operating said accumulators and printing mechanism and for causing said locking devices to release any of said keys which may be detained thereby.

112. In a calculating machine, the combination of a plurality of accumulators; a plurality of rows of number setting keys, one row for each accumulator of a plurality of said accumulators for controlling accumulations thereon; a plurality of detaining plates one member for each row of a plurality of said rows of keys, for detaining any of a plurality of the keys thereof in set position when set; printing mechanism for printing items set up on said keys; a plurality of special keys operable to effect printing by said printing mechanism of the total standing on said accumulators and clearing of the same, and to effect printing by said printing mechanism of the total standing on said accumulators and retaining said total in said accumulators; and means whereby the depression of any one of said special keys, effects release from their respective detaining plates of any of said number setting keys detained thereby.

113. In a calculating machine the combination of a plurality of accumulators, printing mechanism for printing items accumulated on said accumulators, a total key operable to effect printing by said printing mechanism of the total standing on said accumulators, a device for automatically locking said total key in operative position upon the operation of the latter, a plurality of number keys which may be set for controlling said accumulators and printing mechanism and which when set will remain set without being manually held in set position, and means operable by said total key so as to prevent such setting of said number keys.

114. In a calculating machine, the combination of a plurality of accumulators, actuators therefor, controlling means for determining items to be entered on said accumulators by said actuators, operating mechanism for said machine, a cam operable by said operating mechanism for effecting accumulating by said accumulators of items according to the control of said controlling means, and a second cam operable by said operating mechanism for effecting turning of said accumulators to zero.

115. In a calculating machine, the combination of a plurality of accumulators, actuators therefor, controlling means for determining items to be entered on said accumulators by said actuators, printing mechanism for printing items accumulated on said accumulators, operating mechanism for said machine, a cam operable by said operating mechanism for effecting accumulating by said accumulators and printing by said printing mechanism of items according to the control of said controlling means, and a second cam operable by said operating mechanism for effecting printing by said printing mechanism under control of said accumulators of the total standing on said accumulators.

116. In a calculating machine, the combination of a plurality of accumulators, actuating means therefor, manipulative means for controlling the actuating of said accumulators, printing mechanism for printing the items accumulated on said accumulators, operating means for operating said machine according to the control of said manipulative means, and a total key which can be set before the operation of the machine and will automatically remain in said set position for effecting, upon operating said operating means, printing by said printing mechanism of the total standing on said accumulators and retaining said total on said accumulators.

117. In a calculating machine, the combination of a plurality of accumulators, actuating mechanism therefor, printing mechanism for printing items accumulated on said accumulators, means whereby said printing mechanism may be caused to print the total standing on said accumulators, and a locking device adapted to positively lock said accumulators against movement during printing of said total by said printing mechanism under control of said means.

118. In a calculating machine, the combination of a plurality of accumulators, actuating mechanism therefor, printing mechanism for printing items accumulated on said accumulators, means whereby said printing mechanism may be caused to print the total standing on said accumulators, and a locking device adapted to temporarily positively lock said accumulators against movement during printing of said total by said printing mechanism under control of said means and to automatically release said accumulators to permit the latter to be turned to zero during the same operation of said machine in which said total is printed.

119. In a calculating machine, the combination of an accumulating mechanism; means for accumulating items thereon; operating mechanism for said machine; means for obtaining a total from said accumulating mechanism and clearing the same during a single cycle of operation of said operating mechanism, said means comprising a total key; and means non-dependent on the operation of said operating mechanism for holding said total key in operative position.

120. In a calculating machine, the combination of an accumulating mechanism; means for accumulating items thereon; operating mechanism for said machine; means for obtaining a total from said accumulating mechanism and clearing the same during a single cycle of operation of said operating mechanism, said means comprising a total key; means non-dependent on the operation of said operating mechanism for holding said total key in operative position; and means whereby said total key may be automatically released during said cycle of operation.

121. In a calculating machine comprising registering wheels and printing mechanism co-operating with said registering wheels, the combination of key controlled means for causing said printing mechanism to print the total registered on said registering wheels, and clear same a locking device for automatically locking said keys in its operative position when depressed, and automatic means for releasing said key after said total has been printed.

122. In a calculating machine comprising a plurality of accumulators and printing mechanism for printing items accumulated on said accumulators, the combination of a total key for controlling the printing of a total from said accumulators by said printing mechanism, and a locking device for detaining said total key in set position when set and operable to release said key without effecting printing of a total.

123. In a calculating machine comprising a plurality of accumulators and printing mechanism for printing items accumulated on said accumulators, the combination of a total key for controlling the printing of a total from said accumulators by said printing mechanism, a locking device for detaining said total key in set position when set, and means for releasing said total key from said locking device without effecting printing of a total.

124. In a calculating machine, the combination of a plurality of accumulators, printing mechanism for printing items accumulated on said accumulators and for printing under control of said accumulators the totals accumulated on said accumulators, common operating mechanism for said accumulators and said printing mechanism, a device for rendering said accumulators ineffective without effecting said printing mechanism, and a device for rendering said printing mechanism ineffective without affecting said accumulators.

125. In a calculating machine, the combination of accumulators, printing types for printing items accumulated on said accumulators, a plurality of sets of keys one set of keys for each accumulator of a plurality of said accumulators for determining items to be accumulated and printed, a platen for backing a record sheet for receiving printing impressions from said types, an inking means co-operative with said platen and said printing types, line-spacing mechanism whereby said platen is caused to feed said record sheet between printing impressions of said types, and operating mechanism for operating said accumulators and said printing types according to the control of said keys and for operating said inking means and said line-spacing mechanism, all of the mechanism of said machine being so correlated that each item printed is automatically rendered visible to the operator at the end of the operation in which it is printed.

126. In a calculating machine, the combination a plurality of accumulators; types; a plurality of type carriers adapted to position said types so as to print the digits accumulated on said accumulators; a plurality of keys for controlling the items accumulated by said accumulators and printed by the types carried by said type carriers, each of said keys being movable from normal ineffective position to fully effective position without effecting any other of said keys which is in normal position; and operating mechanism for simultaneously operating said accumulators to accumulate and positioning said type carriers for printing the same item according to the control of said keys.

127. The combination of calculating mechanism, a platen, number types co-operative with said calculating mechanism and platen so as to print numbers according to the calculations of said calculating mechanism, a plurality of number keys, stops settable by said keys for controlling operation of said calculating mechanism and types, and a manually-actuated operation-controlling member the manipulation of which causes said types to print in an early part of the operation of the machine and causes said calculating mechanism to register the number determined by said stops before said types have printed said number.

128. In a calculating machine, a depressible key, a motion transmitting device controlled thereby, a ciphering device adapted to cooperate with said motion-transmitting device upon a depression of the key, means for retaining said key in its depressed position, and means for actuating the motion-transmitting device and for subsequently releasing the key-retaining means.

129. In a calculating machine, a spring influenced depressible key, a rotary motion transmitting device controlled thereby, a ciphering device adapted to cooperate with said motion-transmitting device upon a depression of the key, means for retaining said key in its depressed position, and means for rotating the motion-transmitting device and for subsequently releasing the key-retaining means.

130. In a calculating machine, a spring influenced depressible key, a toothed sector controlled thereby a toothed wheel adapted to be engaged by the sector upon a depression of the key, means for retaining said key in its depressed position, a ciphering device operated by said toothed wheel, and means for rotating the sector and for subsequently releasing the key retaining means.

131. In a calculating machine, a spring influenced depressible key, a toothed sector controlled thereby, a toothed wheel adapted to be engaged by the sector upon a depression of the key, means for retaining said key in its depressed position, a ciphering device operated by said toothed wheel, and a manually operable crank for rotating the sector and subsequently releasing the key.

132. In a calculating machine, a ciphering device, a depressible key, a crank, a motion-transmitting device operable by said crank and adapted to actuate the ciphering device upon a depression of the key, and an oscillating detent adapted to lock the key in its depressed position.

133. In a calculating machine, a ciphering device, a depressible key, a crank, a motion-transmitting device operable by said crank and adapted to actuate the ciphering device upon a depression of the key, an oscillating detent adapted to lock the key in its depressed position, and a crank adapted to actuate the motion-transmitting device and subsequently operate the detent for unlocking the key.

134. In a calculating machine, a ciphering device, a depressible key, a crank, a motion-transmitting device operable by said crank and adapted to actuate the ciphering device upon a depression of the key, an abutment on the key, and an oscillating detent adapted to engage said abutment.

135. In a calculating machine, a plurality of rows of depressible keys, motion transmitting devices controlled thereby, ciphering devices adapted to cooperate with the motion transmitting devices of the respective key-rows, swinging detents adapted to maintain the keys in their depressed position, and means for tilting said detents to thereby release the keys.

136. In a calculating machine, a plurality of keys, abutments on said keys, motion-transmitting devices controlled by the keys, ciphering mechanism adapted to be actuated by said motion transmitting devices, a plurality of oscillating detents adapted to engage the abutments, a spring influenced slide adapted to engage the detents, a cam and an additional key, both of which last named elements are adapted to actuate the slide.

137. In a machine of the character described, the combination with the forked pitman, of devices for reciprocating the same, and a controller adjustable to render said devices operative or inoperative on the pitman.

138. In a calculating machine, an actuating member, a calculating mechanism, a movable controlling member, a power-transmitting element carried with the controlling member and movable relatively thereto into and out of position to coact with the calculating mechanism and means for positively effecting the movement of the power-transmitting member relatively to the controlling member, substantially as and for the purpose described.

139. In a machine of the class described, the combination of an accounting device, a member having an invariable movement on operations of the machine, an actuator for the accounting device, means for connecting the actuator with said member, through which the latter drives the former, a movable stop for the actuator and connections whereby the accounting device positions the stop to limit the movement of the actuator and permit further movement of said member independent of the actuator.

140. In a device of the kind described, a plurality of series of keys, an independent item indicator for each series, adapted to indicate the particular key operated, means adapted to hold each item indicator in its indicating position until a key of that series is again operated, means whereby the said means is released in a subsequent operation, in combination with intermediate mechanism between the keys and the indicators, whereby the movement of the keys is transmitted to and actuates the indicators.

141. In an accounting machine, the combination with a totalizer, of a differentially movable actuator therefor, means normally preventing movement of said actuator, a series of keys for disabling the preventing means and for determining the extent of movement of the actuator, and an indicator differentially positioned by said keys for indicating the extent of movement to be imparted to the actuator.

142. In an accounting machine, the combination with a main driving mechanism, of a totalizer, actuators for the totalizer operated upon an operation of the main driving mechanism, indicators, keys operable to predetermine the amount to be entered on the totalizer by said actuators during a subsequent operation of the actuators by the main driving mechanism, and means whereby operation of the keys will differentially adjust the indicators to indicate the amount to be entered on the totalizer.

143. The combination of a common source of power with a plurality of number bearing members operable therefrom, keys for rendering said number bearing members active, a locking mechanism for retaining said keys in their actuated positions and a releasing mechanism operable from the common source of power for releasing said keys for the return thereof to their normal positions independently of the number bearing members.

144. In an adding machine, the combination with the totalizing and printing mechanisms thereof and with the main operating rock shaft of the machine, of operating connections with the totalizing mechanism, and a cam mounted on the rock shaft and arranged to actuate said operating connections.

145. The combination with setting-up mechanism, of computing mechanism, a general operator for running into the computing mechanism numbers set up by said setting-up mechanism, and means to enable said general operator to change the normal character of the computation, said general operator also acting to restore said changing means to normal.

146. In a machine of the class described, the combination with an accumulating mechanism and printing devices, of differential mechanism for variously setting said printing devices, manipulative means for controlling said differential mechanism, keys for controlling said manipulative means, totaling elements and connections actuated thereby but controlled from said accumulating mechanism for selectively operating said manipulative means.

147. In a machine of the class described, the combination with numeral wheels and manipulative devices for differentially controlling the same, of a totaling element; keys for controlling said manipulative devices, means rendered operative by said totaling element and controlled by said numeral wheels for controlling the operation of said manipulative devices; and type carriers positioned under the control of said devices.

148. In a machine of the class described, the combination with totalizer elements, and manipulative devices for differentially controlling the same, of a totaling element, keys for controlling said manipulative devices, means for controlling the operation of said manipulative devices, connections whereby said totalizer elements control said controlling means, and record mechanism positioned under control of said devices.

149. In a machine of the class described, the combination with a series of movable totalizer elements, of means for differentially moving same, manipulative devices adjustable to set up items to be entered on the totalizer by the operating means, keys for controlling said manipulative devices, and mechanism controlled by the totalizer for automatically controlling the adjustment of said manipulative devices to set up thereon the total on the totalizer.

150. In a machine of the class described, the combination with a type carrier, of differential mechanism therefor, a set of keys, a set of stops through which said keys control said mechanism, and means for differentially positioning said stops independently of operations of said keys.

151. In a calculating machine, the combination with a gear pinion and its co-operating gear segment, adapted to be engaged and disengaged, of a movable controlling shoulder operatively connected with said segment, means providing for a limited movement of said segment with respect to said shoulder, and a movable stop member provided with a plurality of fixed stops which are arranged differentially and adapted to stop said shoulder at different points in its forward movement, substantially as described.

152. In a machine of the class described, the combination with a totalizer and type carriers, of operating mechanism whereby said totalizer and type carriers may be actuated for accumulation and printing of items; and means whereby said operating mechanism may be caused to set up on the type carriers the total accumulated on the totalizer and subsequently during the same operation of said operating mechanism to clear said totalizer.

153. In a calculating machine, a totalizer, actuators therefor and normally disconnected therefrom, means for engaging said actuators and said totalizer, means for moving said actuators, manipulative means for controlling the extents of movement of said actuators whereby said actuators enter into said totalizer items set up by said manipulative means, indicators controllable to indicate items entered into said totalizer, and optionally operable controlling means for causing said indicators to assume positions corresponding to the total standing on said totalizer.

154. In a calculating machine, a totalizer, actuators therefor, depressible amount determining means, means for causing said actuators to enter into said totalizer items set up by said amount determining means, indicators controllable to indicate items entered into said totalizer, and means for causing said indicators to assume positions controlled by said totalizer whereby said indicators show the total standing on said totalizer.

155. In a calculating machine, a totalizer, actuators therefor, a plurality of depressible numeral keys, means for causing said actuators to enter into said totalizer items set up by depressed numeral keys, indicators controllable to indicate items entered into said totalizer, means for automatically releasing depressed numeral keys during the operation of the machine, and means for positioning said indicators in accordance with the total standing on said totalizer without depressing any of said numeral keys.

156. In a calculating machine, the combination of a plurality of accumulators of successive denominational orders; a set of actuators, one for each accumulator, for actuating its respective accumulator; a plurality of rows of controlling keys, one row for each accumulator and respective actuator, for controlling the extent of movement of the respective actuator and accumulator; means for detaining the actuator of each row; means for releasing the actuator of any row when any key is depressed in the row; a set of dials, one for each accumulator and its respective actuator and controlling keys; a manipulative operation controlling device having a normal position in which said actuators may be caused to actuate said accumulators according to the setting of their respective keys and said dials caused to indicate the amounts added on said accumulators, and having a moved position in which to cause said dials to indicate the total of the amount added on said accumulators.

157. In a calculating machine, a totalizer, actuators therefor having variable extents of movement, a plurality of depressible amount determining keys, indicators settable under control of said keys to indicate the items set up, general operating mechanism adapted to drive said actuators varying extents under control of said keys to enter items upon said totalizer, and means operable at will to cause said general operating mechanism to position said indicators under control of the totalizer to indicate the total standing thereon.

158. In a calculating machine, a set of accumulating wheels of successive denominational orders, actuators therefor, a set of indication carrying members, each member corresponding to an accumulating wheel, item entering means for controlling the movements of said actuators and controlling the position of said indication carrying members, and manipulative means for placing said indication carrying members under control of the accumulating wheels to cause said members to assume positions corresponding to the total standing on said wheels.

159. In a calculating machine, a totalizer comprising a plurality of wheels, actuators therefor having variable extents of movement, manipulative amount determining means for controlling the extent of movement of said actuators in items entering operations, indicators under control of said amount determining means, and means operable at the will of the operator to cause said actuators and indicators to assume positions corresponding to the total standing on the totalizer and to cause said actuators to turn said totalizer wheels to their zero positions by a single operation of the machine.

160. In a calculating machine, the combination of a set of accumulators, actuators therefor, depressible keys for controlling extents of movement of said actuators, means for causing said actuators to enter into said set of accumulators items set up on said keys, indicators, means for causing said indicators to assume positions corresponding to the items set up on said keys, and means for causing said indicators to indicate the amount standing on said set of accumulators.

161. In a machine of the class described, a totalizer comprising a plurality of wheels, actuators therefor, depressible keys for controlling said actuators, a plurality of indicators normally independent of said wheels, means for controlling said indicators to indicate the control of said keys, and connections whereby said wheels may control the indicating means to indicate the total standing on the wheels.

162. In a register, the combination with an accumulator wheel; of an accumulator operating element; a series of keys for controlling said element, mechanism correlated with the keys for first moving the accumulator-operating element in one direction for engaging it with said accumulator wheel and then moving the accumulator-operating element in another direction to actuate said accumulator wheel, without effecting movement of the keys not in use, and means under control of said mechanism for restraining movement of said element notwithstanding the setting of a key to controlling position.

163. In a register, the combination with an accumulator wheel; of an accumulator-operating element; a series of keys for controlling said element, a hand-controlled operation controlling member for first moving the accumulator-operating element in one direction for engaging it with said accumulator wheel and then moving the accumulator-operating element in another direction to actuate said accumulator wheel under the control of one of said keys, without effecting movement of the keys not in use and means under control of said member for restraining movement of said element notwithstanding the setting of a key to controlling position.

164. In a calculating machine, the combination with a printing segment provided with a series of type, a register actuating gear segment cooperating therewith, a series of stops for controlling said printing segment, an actuating device for actuating said segment under the control of said stops and connections between said actuating device and said segment adapted to yield and permit the actuator to move independently of the segment when said segment is arrested by one of said stops.

165. The combination with a registering device provided with a stop, of a key lever provided with a series of differential stops any one of which is adapted to be engaged by the stop of the registering device to arrest said registering device at different points in its forward movement.

166. In a calculating machine, the combination of an accumulator, an actuator therefor, a differential stop member for said actuator comprising a lever adapted to be rocked about its pivot to arrest the actuator in any of a plurality of positions, keys having stems adapted to engage said differential stop member for controlling its movement, and operating means for causing operation of said accumulator by said actuator, according to the control of said stop member determined by said keys.

167. In a calculating machine, the combination of a register, an actuator therefor, a differential stop member, and a plurality of settable keys having substantially equal movements and operable by such equal movements to move said differential stop member varying distances.

168. In a calculating machine, the combination of an accumulator device, a differential stop element for controlling registering of items on said accumulating device, a row of setting keys, an element associated with said row of setting keys and provided with a plurality of shoulders each shoulder adapted to engage with a respective one of said keys for controlling said differential stop element.

169. In a calculating machine, the combination of an accumulator, an actuator, a differential stop member movable to different controlling positions, number types cooperative with said accumulator and stop member, and a row of number setting keys for moving the differential stop member to different positions to control the actuator and the position of the number types, said keys being constructed and arranged so that each may be moved to perform its function without moving any other key in its row which is in normal position.

170. In a calculating machine, the combination of two accumulators, two rows of setting keys, one row for each of said accumulators, a stop member associated with each row of keys and provided with a plurality of stops, the stops of one stop member being operable to control proportional movements of its accumulator which movements are different from the proportional movements of the other accumulator controlled by the stops of the other stop member, transfer mechanism for effecting carrying from one of said accumulators to the other of said accumulators, and an operating mechanism for operating both of said accumulators according to the control of their respective stop members.

171. The combination of a pivot shaft, a set of members pivoted thereon at relatively widely spaced points, a second set of members pivoted thereon at relatively narrowly spaced points, and a rigid connector from each of said widely spaced members to one of said narrowly spaced members whereby each of said narrowly spaced members turns in unison with its associated widely spaced member.

WILLIAM S. GUBELMANN.